(12) United States Patent
Mowat et al.

(10) Patent No.: US 7,461,147 B1
(45) Date of Patent: Dec. 2, 2008

(54) NODE SELECTION WITHIN A NETWORK BASED ON POLICY

(75) Inventors: J Eric Mowat, Piedmont, CA (US); Mehul S. Shah, Campbell, CA (US); Szu-wen Kuo, Milpitas, CA (US)

(73) Assignee: NetApp. Inc., Sunnyvale, CA (US)

( * ) Notice: Subject to any disclaimer, the term of this patent is extended or adjusted under 35 U.S.C. 154(b) by 769 days.

(21) Appl. No.: 10/228,434

(22) Filed: Aug. 26, 2002

(51) Int. Cl.
*G06F 15/16* (2006.01)

(52) U.S. Cl. .................. 709/225; 709/201; 709/202; 709/203; 709/223; 709/224; 709/226; 709/238; 709/239

(58) Field of Classification Search ......... 709/201–203, 709/223–226, 238–239
See application file for complete search history.

(56) References Cited

U.S. PATENT DOCUMENTS

| | | | | | |
|---|---|---|---|---|---|
| 6,049,809 | A | * | 4/2000 | Raman et al. ............. | 707/203 |
| 6,119,143 | A | * | 9/2000 | Dias et al. ............... | 709/201 |
| 6,122,630 | A | * | 9/2000 | Strickler et al. .......... | 707/8 |
| 6,163,855 | A | * | 12/2000 | Shrivastava et al. ...... | 714/4 |
| 6,336,117 | B1 | * | 1/2002 | Massarani ............... | 707/100 |
| 6,513,059 | B1 | * | 1/2003 | Gupta et al. ............ | 709/202 |
| 6,665,702 | B1 | * | 12/2003 | Zisapel et al. ........... | 718/105 |
| 6,687,731 | B1 | * | 2/2004 | Kavak .................... | 718/105 |
| 6,760,745 | B1 | * | 7/2004 | Tan et al. ................ | 709/203 |
| 6,832,253 | B1 | * | 12/2004 | Auerbach ............... | 709/226 |
| 6,959,333 | B2 | * | 10/2005 | Beaumont et al. ........ | 709/223 |
| 7,103,586 | B2 | * | 9/2006 | Holenstein et al. ........ | 707/1 |
| 7,111,061 | B2 | * | 9/2006 | Leighton et al. .......... | 709/224 |
| 2002/0010798 | A1 | * | 1/2002 | Ben-Shaul et al. ....... | 709/247 |
| 2002/0029287 | A1 | * | 3/2002 | Yemini et al. ........... | 709/238 |
| 2002/0049845 | A1 | * | 4/2002 | Sreenivasan et al. ..... | 709/226 |
| 2002/0091855 | A1 | * | 7/2002 | Yemini et al. ........... | 709/238 |
| 2002/0099728 | A1 | * | 7/2002 | Lees et al. .............. | 707/203 |
| 2002/0143991 | A1 | * | 10/2002 | Chow et al. ............. | 709/245 |
| 2002/0163884 | A1 | * | 11/2002 | Peles et al. .............. | 370/229 |
| 2002/0174225 | A1 | * | 11/2002 | Smith et al. ............. | 709/226 |
| 2002/0194251 | A1 | * | 12/2002 | Richter et al. ........... | 709/105 |
| 2002/0194526 | A1 | * | 12/2002 | Ulrich et al. ............ | 714/6 |
| 2003/0099202 | A1 | * | 5/2003 | Lear et al. .............. | 370/238 |
| 2003/0110274 | A1 | * | 6/2003 | Pazi et al. .............. | 709/229 |
| 2003/0120680 | A1 | * | 6/2003 | Agrawal et al. ......... | 707/103 R |
| 2003/0126200 | A1 | * | 7/2003 | Wolff ................... | 709/203 |
| 2003/0182423 | A1 | * | 9/2003 | Shafir et al. ............ | 709/225 |
| 2004/0054805 | A1 | * | 3/2004 | Sen et al. ............... | 709/240 |
| 2004/0078419 | A1 | * | 4/2004 | Ferrari et al. ........... | 709/201 |
| 2004/0168119 | A1 | * | 8/2004 | Liu et al. ............... | 715/501.1 |
| 2005/0010653 | A1 | * | 1/2005 | McCanne ............... | 709/219 |
| 2006/0112176 | A1 | * | 5/2006 | Liu et al. ............... | 709/223 |

\* cited by examiner

*Primary Examiner*—Alina N. Boutah
(74) *Attorney, Agent, or Firm*—Perkins Coie LLP

(57) ABSTRACT

The invention includes a method for selecting a replicated node from a domain of replicated nodes in a computer network. The method comprises maintaining a list of the replicated nodes; receiving a name resolution request to resolve a name for the domain into a network address; selecting one of the replicated nodes based on predefined selection criteria and in response to the name resolution request; and sending a network address of the selected replicated node to a network address associated with the name resolution request.

15 Claims, 24 Drawing Sheets

NODE SELECTION WITHIN A NETWORK BASED ON POLICY

FIELD OF THE INVENTION

This invention relates to computer networks. In particular, the invention relates to a method and apparatus for selecting a node in a computer network.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

In order to enhance user experience in a computer network, for example, the Internet, frequently accessed content or services may be replicated on more than one node (hereinafter referred to as a "replicated node"), often located at different geographic locations. A request for content or a service may then be dynamically redirected or re-routed between the replicated nodes in order to improve user experience. For example, if one node is not functioning at all, the request may be redirected to one of the replicated nodes which is still functioning. Another way of improving user experience includes determining the proximity between a client node making the request to each of the replicated nodes, and then redirecting the request to the replicated node that is nearest the client node. In this way, a latency perceived by the client node in order to receive a reply to the request is reduced.

One problem with redirecting the request as described above is that the nearest node may currently be the most overloaded node in the network, and thus instead of improving user experience, redirection to that node may actually further degrade user experience.

SUMMARY

According to one embodiment of the invention there is provided a method for selecting a replicated node from a domain of replicated nodes in a computer network. The method comprises maintaining a list of the replicated nodes; receiving a name resolution request to resolve a name for the domain into a network address; selecting one of the replicated nodes based on predefined selection criteria and in response to the name resolution request; and sending a network address of the selected replicated node to a network address associated with the name resolution request.

DETAILED DESCRIPTION

Figure 1:
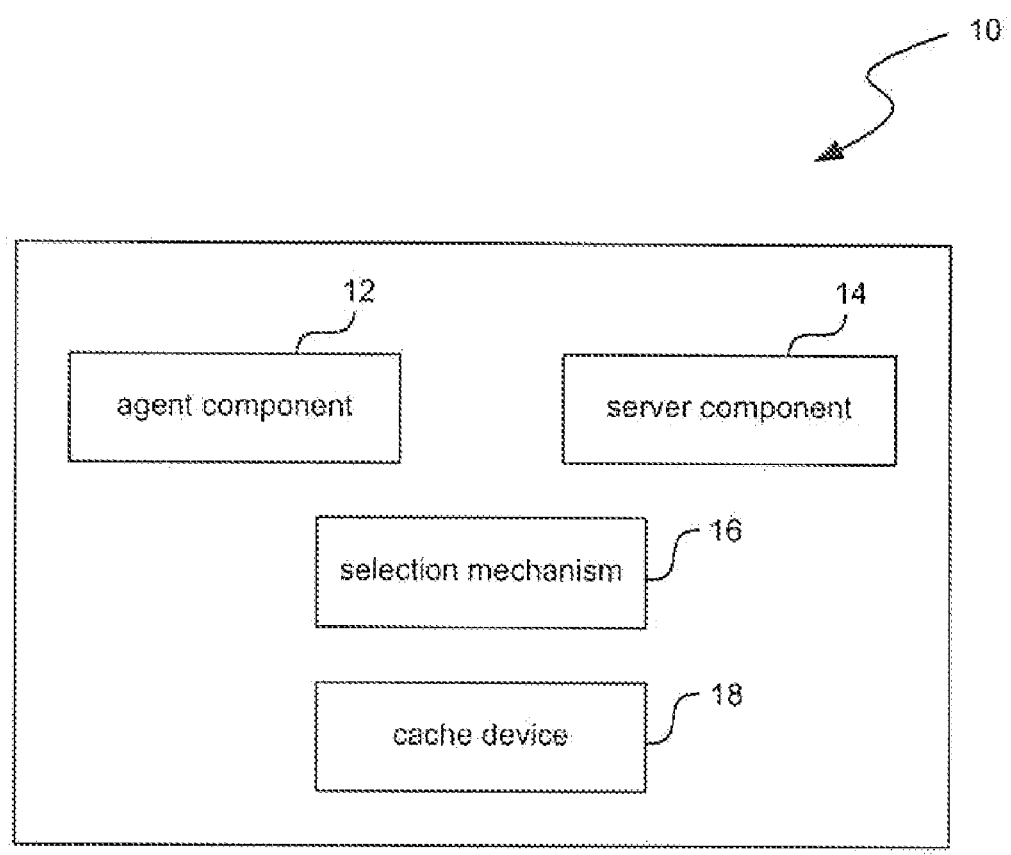
FIG. 1 shows a functional block diagram of a network device in accordance with one embodiment of the present invention.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In one embodiment, the invention provides a network device comprising a server component, an agent component and a cache component. Each of the server components and the agent components may be selectively enabled by inputting an authorization key into the network device. Preferably, the authorization key is obtained under a license to enable either the agent component or the server component or both.

The network device of the present invention may be deployed within a computer network as either an agent/cache device or a server/cache device. When deployed as an agent/cache device, the network device may be configured to report information relating to the cache component, for example, central processing unit (CPU) utilization, disk utilization, etc. (hereinafter collectively referred to as the "health" of the cache component) to a server/cache device in the computer network. The server/cache device combination may be configured to act as an authoritative server for a domain served by each agent/cache device. Thus, the server/cache device combination may be used to resolve domain name requests, for example, domain name service (DNS) requests.

When resolving a domain name request, the server/cache device combination uses the reported information on the health of each agent/cache device node in the network to select an agent/cache device node to deliver information or content to a network address associated with the domain name resolution request.

In some embodiments, the server/cache device combination has a rules database comprising selection rules for selecting one of the agent/cache device nodes in the network to deliver the content. For example a rule may specify that certain types of content may not be delivered from a particular agent/cache device node in the network based on its geographic location. Thus, for example, requests for pornographic material may be restricted for delivery by nodes outside a particular country, notwithstanding that there are nodes within the particular country that are able to deliver the pornographic content to a requesting network address within the particular country.

One advantage of the techniques disclosed herein is that it allows a special-purpose content delivery network (CDN) to be constructed using existing infrastructure. For example streaming media content relating to a live broadcast event may be delivered to a large number of subscribers without having to deploy and test new hardware. Existing hardware may be used as part of the special-purpose content delivery network (CDN) by configuring existing server/cache and agent/cache devices. Other advantages of the techniques disclosed herein will become apparent from the description that follows.

FIG. 1 of the drawings shows a high-level functional block diagram of a network device 10 in accordance with one embodiment. Referring to FIG. 1, it will be seen that the network device 10 comprises an agent component 12, a server component 14, and a selection mechanism 16 to selectively enable either the agent component 12 or the server component 14. The network device 10 further comprises a cache device 18. The purpose of the cache device 18 is to cache content at a particular location selected so as to provide fast delivery of the content to a requesting network address. The network device 10 is able to function as an agent or as a server depending on whether the agent component 12 or the server component 14 has been enabled. Enabling the agent component 12 or the server component 14 is achieved by the selection mechanism 16 which, in some embodiments, uses an authorization key to enable either the agent component 12 or the server component 14. The authorization key may be obtained by purchasing a license to use either the agent component 12 or the server component 14.

Figure 2:
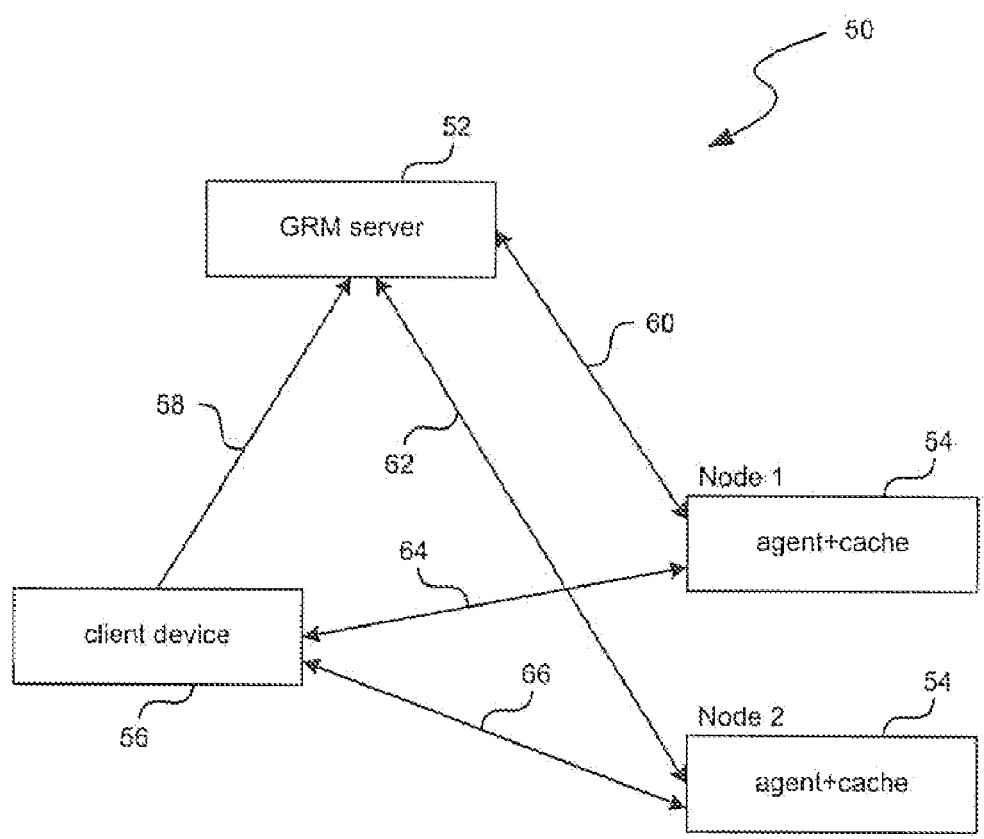
FIG. 2 shows one embodiment of a network architecture deploying network devices in accordance with the present invention.

According to techniques of the present invention, the network device 10 may be deployed in a computer network in order to select a particular node in the network to deliver content to a network address that requested the content. This aspect is illustrated with reference to FIG. 2 of the drawings which shows one embodiment of a network architecture deploying the network devices 10. Referring to FIG. 2, reference numeral 50 generally indicates a network architecture deploying a plurality of network devices 10. In particular, the network architecture 50 comprises a global request manager (GRM) server 52 and a number of nodes 54, only two of which have been shown.

The GRM server 52 is actually an embodiment of the network device 10 with the server component 14 enabled, whereas the network nodes 54 are actually embodiments of the network device 10 with the agent component 12 enabled. Reference numeral 56 designates a client device representing the network address that requested the content. In the network architecture 50, the client device 56, or a DNS agent acting on behalf of the client device 56, makes a DNS name resolution request 58 to the GRM server 52. In response, the GRM server 52 performs a database check to determine if it has proximity information about the network address (IP address) of the client device 56. If the GRM server 52 has no proximity information then it returns the network address of one of the nodes 54, which it randomly selects, to the client device 56. At the same time the GRM server 52 sets a very low time to live (TTL), effectively forcing the client device 56 to again request resolution of the domain name after expiration of the TTL.

If the GRM server 52 determines that it has no proximity information for the client device 56, it instructs each agent 54 to attempt to discover the agent's proximity to the client device 56, or to a DNS name resolver, as the case may be. Each agent 54 then attempts to discover its proximity to the client device 56, or the DNS name resolver using techniques such as by ICMP, trace routes, or DNS lookup time. Arrows 60, 62 denote the GRM server 52 instructing the nodes 54 to perform the proximity measurements. Arrows 64, 66 denote the nodes 54 attempting to determine the proximity to the client device 56. The GRM server 52 stores the proximity information obtained from the nodes 54 and uses this information when the client device 56, or ISP DNS name resolver, next requests resolution of the domain name, to determine the nearest nodes 54 to the client device 56 which can be used to deliver content.

In one embodiment, the GRM server 52 is able to instruct the nodes 54 to perform the following proximity checks: 1. ICMP Echo: with this technique, each agent/cache 54 attempts to "ping" the target and measures the latency in the ICMP echo response. 2. DNS round trip time $(RTT)_{[JB1]}$: with this technique, each agent/cache 54 measures the amount of time it took to perform a reverse DNS lookup on the target. 3. Trace route: with this technique each agent/cache 54 attempts to perform a trace route to the target, and records the latency to the last hop that was reached. If at least three agents/caches 54 agree about the location of the last hop, the proximity check is accepted as valid.

Figure 3:
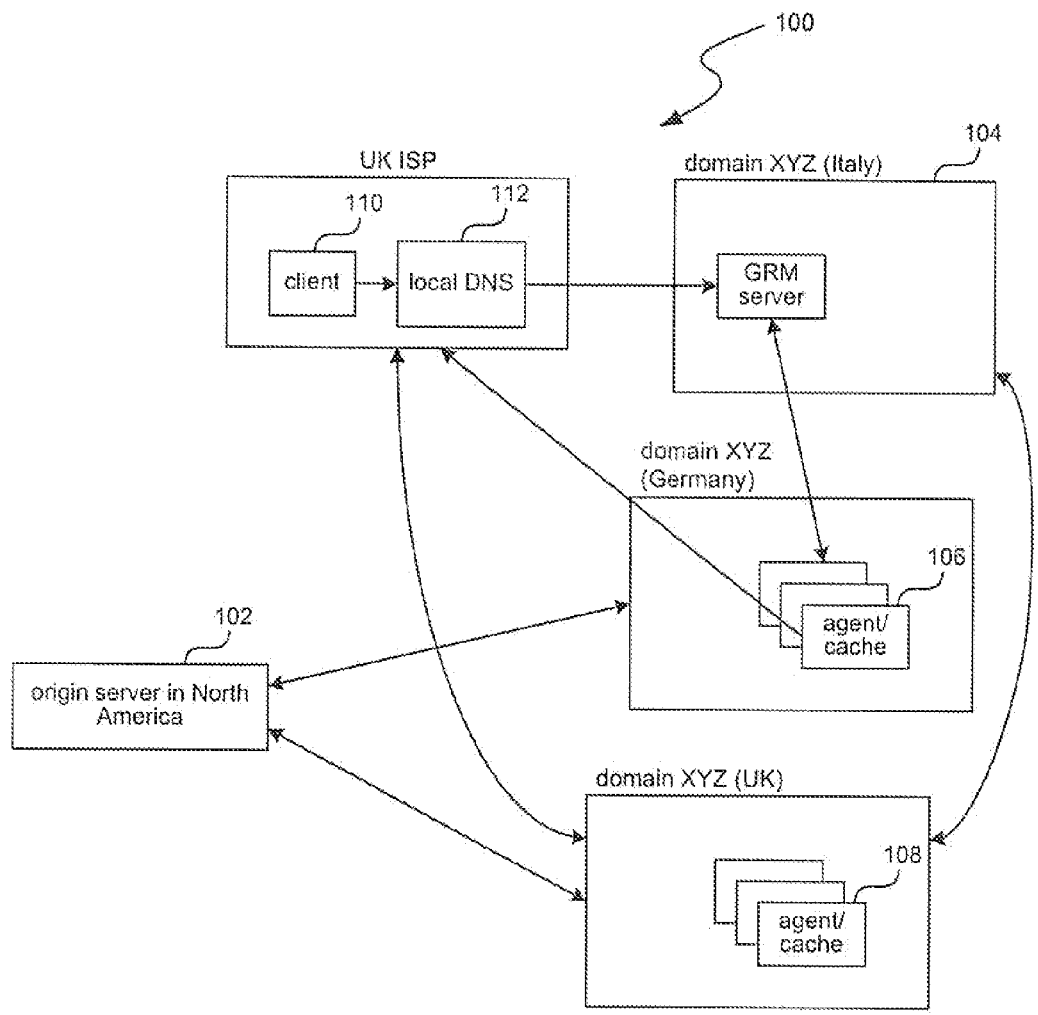
FIG. 3 shows a content delivery network in accordance with one embodiment of the present invention.

According to other techniques of the present invention, the network device 10 may be deployed at various geographic locations in order to build a CDN. One embodiment of such a CDN 100 is illustrated in FIG. 3 of the drawings. Referring to FIG. 3, it will be seen that the CDN 100 includes an origin server 102 which, for purposes of illustration, is located in North America. Also for purposes of illustration, assume that the origin server 102 is the origin point of streaming media content in the CDN 100. For example, the origin server 102 may be the origin of a data stream carrying content relating to a live broadcast event such as a concert. In order to deliver the data stream to various delivery points in Europe, for example, the CDN 100 includes a GRM server 100 104, and agent/caches 106 and 108 respectively. The GRM server 104 is implemented as a network device 10 with the server component 14 enabled, whereas the agent/caches 106, and 108 are implemented as network devices 10 with the agent component 12 enabled. The exact number of the GRM server 104 and the agent/caches 106, 108 may vary from implementation to implementation. In use, a client device 110 uses the CDN 100 in order to view the streaming media as will be described below.

Once the components 102, 104, 106, and 108 have been deployed the CDN 100 may be configured to deliver the streaming content. It is important to keep in mind that the components 102, 104, 106, and 108 need not be specifically deployed in order to broadcast a particular event, but may form part of existing infrastructure that can be configured to broadcast the event.

Configuring the CDN 100 includes assigning a domain name to the CDN 100, which will be used by various client devices in order to gain access to the streaming media content. For purposes of this example, assume that in order to broadcast a live event such as a U2 concert in New York, the domain name "XYZ.com" is assigned to the CDN 100. Assume further that the client device 110 is located in the United Kingdom, that the GRM server 104 is located in Italy, and that the agent/caches 106, and 108 are located in Germany and the United Kingdom, respectively. In order to receive a video stream for the U2 concert, a user uses the client device 110 to logon to the host "XYZ.com". The client device 110 contacts a local DNS resolver 112 of an Internet service provider (ISP) for the user in order to resolve the domain name "XYZ.com". The local DNS resolver 112 makes a number of iterative resolution requests in order to resolve the domain name "XYZ.com". For example, the local DNS resolver 112 would contact one of the Internet root name servers to find out the authority for the ".com" namespace. Thereafter, the local DNS resolver 112 would contact the authority for the ".com" namespace in order to find out who controls the domain name XYZ.com. Ultimately, the local DNS resolver 112 would contact the GRM server 104 and request a set of network (IP) addresses for the stream "stream.cdn-xyz.com". In response, the GRM server 104 would perform a database check to determine if it has proximity information for the network address of the client device 110.

If the GRM server 104 has no proximity information, then the GRM server 104 sets a short TTL and return, to the local DNS resolver 112, the network address of one of the agent/caches 106, 108, which it randomly selects. In the meantime, the GRM server 104 instructs each agent/cache in the CDN 100 to attempt to discover its proximity to the local DNS resolver 112. As stated above, this may be done using by ICMP pings, trace routes, or DNS lookup times. After expiration of the TTL, the local DNS resolver 112 again contacts the GRM server 104 in order to resolve the domain name "XYZ.com". By this time, the GRM server 104 would have determined that the agent/cache 108, being located in the United Kingdom, should be used as a content delivery point to deliver the streaming media content to the client device 110. Accordingly, the network address of the agent/caches 108 is provided to the client device 110.

It must be borne in mind that besides proximity information each agent/cache in the CDN 100 reports information on the state of health of its respective cache. For example, metrics such as CPU and disk utilization, streaming load etc., of each cache is reported. The particular network protocols supported by each cache may also be reported. In some embodiments, when selecting an agent/cache as a content delivery point, the GRM server 104 factors in the health of each cache. Thus, in the example shown in FIG. 3 of the drawings, if the GRM server 104 determined that the agent/cache 108 was currently overloaded it would not select that cache as a content delivery point. Instead, the GRM server 104 would select the next agent/cache in the CDN 100 that is closest to the client device 110, but which is not overloaded. In order to perform a selection of an agent/cache as a content delivery point in a manner that factors in a state of health of each cache in the content delivery network, the GRM server 104 may be configured with rules, selection criteria, policy, etc. In one embodiment, the GRM server 104 may conveniently be provided with a user interface, preferably a graphical user interface (GUI) that may be used to configure the GRM server 104 with rules, selection criteria, policy, etc. to facilitate selection of a cache.

As described above, the metrics collected by each agent/cache in the CDN 100 may include CPU utilization, disk utilization, and streaming load, for example. In one embodiment, CPU utilization is defined as the percentage of time that the CPU of a cache is busy within a time sampling interval. Thus, a rule may be written for the GRM server 104, which specifies that if CPU utilization of an agent/cache is above a certain percentage then that agent/cache is automatically eliminated from the selection process. Similarly, disk utilization is defined as the percentage of time that the disks of the agent/cache are busy within a time sampling interval. In one particular embodiment, the CPU utilization and disk utilization are normalized to 95 percent and 85 percent, respectively. This allows a rule to be written for the GRM server 104 that prevents selection of an agent/cache that has a CPU utilization of greater than 95 percent and a disk utilization of greater than 85 percent. In another embodiment, streaming load is defined as the number of simultaneous connections supported by an agent/cache. In order to prevent selection of an agent/cache that is supporting a high number of simultaneous connections, a value for example of 70, may be set within a rule in the GRM server 104 so that if the actual number of simultaneous connections supported by an agent/cache exceeds that value then streaming load is set to 100 percent, the rule would eliminate or exclude such an agent/cache from being selected.

In another embodiment; it is possible to group the agent/caches within the CDN 100. For example, several agent/caches within the CDN 100 may be grouped together to serve content for a particular domain. Thus, when a client device requests content from that particular domain only those agent/caches grouped in the domain are considered during the selection process. The ability to group caches together provides yet a further mechanism to improve content delivery. This is because it allows fine tuning of the content that an agent/cache in a content delivery network is allowed to serve, thereby preventing overload of the agent/cache and hence improving a user experience. In order to understand grouping of agent/caches within a domain, consider the domain "Disney.com" which serves hypermedia content relating to Disney™. It will be seen that if several agent/caches within a content delivery network are grouped so that they are only allowed to serve content relating to the domain "Disney.com", each agent/cache within the group will only receive requests relating to the domain "Disney.com". As each agent/cache within the group is shielded from receiving requests related to other domains, the result is that the agent/caches within a group are able to act as fast content delivery points within the content delivery network since their streaming loads can be reduced by grouping. In some embodiments grouping of agent/caches within the content delivery network may be by domain name, by geographic area, or by any other criterion.

Figure 4:
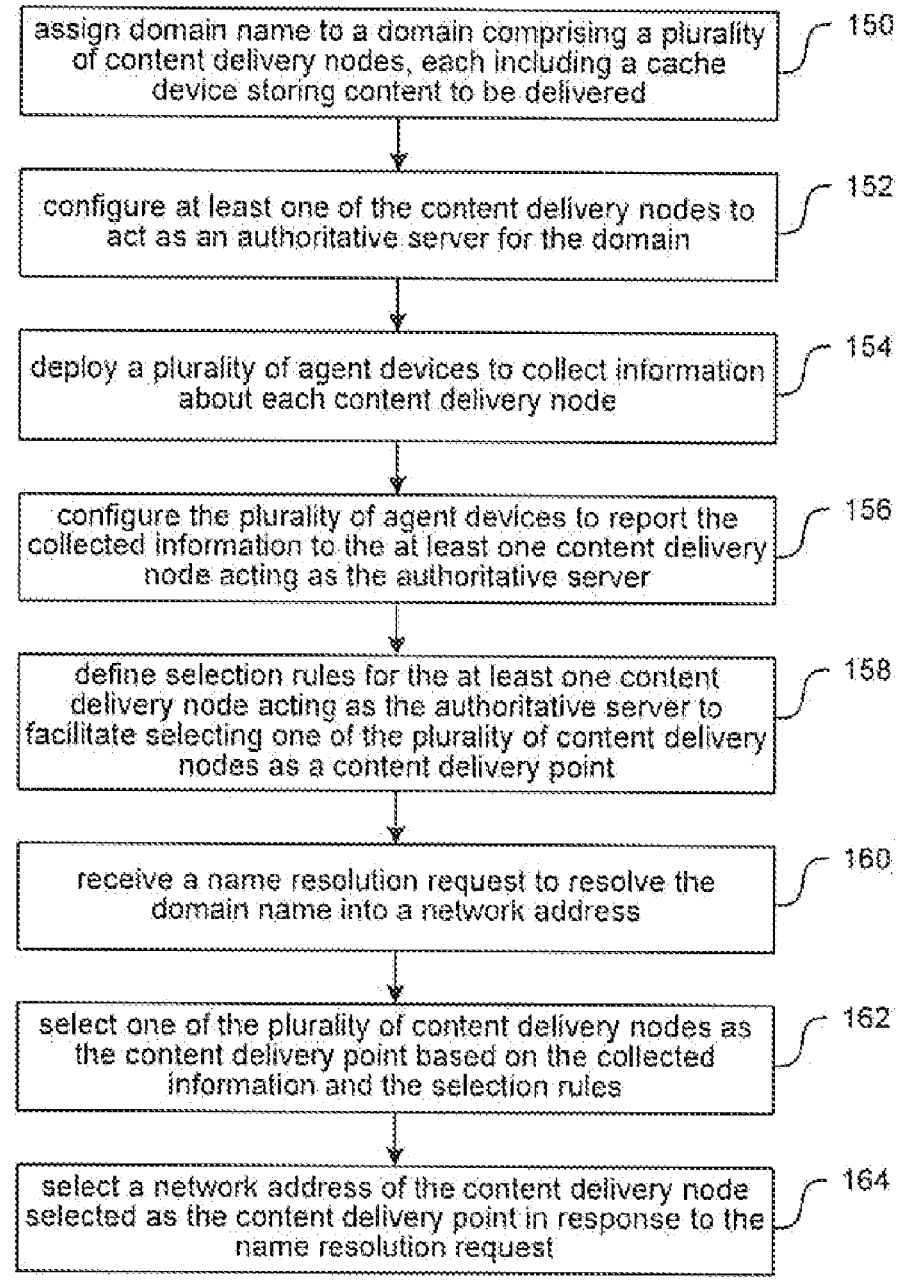
FIG. 4 shows a flow chart of operations performed when constructing a content delivery network in accordance with the present invention.

Having described the content delivery network 100, the particular operations performed in order to construct such a content delivery network are illustrated in FIG. 4 of the drawings. Referring to FIG. 4, at block 150 a domain name is assigned to a domain comprising a plurality of content delivery nodes, each of which includes a cache device storing content to be delivered. At block 152, at least one of the content delivery nodes is configured to act as an authoritative server for the domain. At block 154, a plurality of agent devices are deployed. Each agent device collects information about each content delivery node. As mentioned above, each agent device collects information on a state of health of a particular cache device within the content delivery network. Further, each agent device collects proximity information when instructed to do so by the authoritative server as described above. As a variation to the operations performed at block 154, in one embodiment, the agent devices may form part of existing network infrastructure. Thus, the operations performed at block 154 are optional. At block 156 the agent devices are configured to report the collected information to the at least one content delivery node acting as the authoritative server. In one embodiment, each agent device reports that collected information every 30 seconds to the authoritative server.

At block 158, selection rules are defined for the at least one content delivery node acting as the authoritative server. These selection rules facilitate selecting one of the plurality of content delivery nodes as a content delivery point. As used herein, the term "selection rules" is to be interpreted broadly to include any type of rule, policy, or selection criterion that may be applied by the content delivery node acting as the authoritative server in order to select one of the content delivery nodes as a content delivery point. For example, when configuring each content delivery node, a location is associated with each content delivery node. Thus, a content delivery node located in Germany may have a location value of "de". Further, the content delivery node may be classified as being in East Germany in which case a value "East" is associated with the content delivery node. If the content delivery node is located in West Germany, then a value "West" is associated with each content delivery. In order to facilitate selection of the content delivery node based on location, the content delivery node acting as the authoritative server may have a rule which specifies that a domain will be served only by caches in a specified region. It will be appreciated that other schemes, such as latitude and longitude, may be used in order to define a location for a content delivery node.

The content delivery node acting as the authoritative server may also have rules to facilitate content delivery node selection from within defined groups. This aspect has been described above. Since the information collected and reported by each agent device to the authoritative server includes what networking protocols are supported by each content delivery node, a rule may be written for the content delivery node acting as the authoritative server which specifies that a particular domain will only be served by caches that match a networking protocol used by the domain. If a particular content delivery node does not support a networking protocol used by a particular domain, then it is automatically excluded from the selection process when a request for content from that particular domain is received by the content delivery node acting as the authoritative server.

For example, streaming media relating to the U2 concert may have a streaming uniform resource locator (URL) encoded in the form:

rtsp://stream.cdn-xyz.com/broadcast/U2_live/concert.rm.

This indicates that the streaming media was encoded using the RTSP networking protocol. If a content delivery node supports only MMS, or QuickTime™, this content delivery node will be automatically excluded from the selection process. In each of the above cases, it is important to note that an authoritative server has the ability to select itself as the content delivery point, i.e., it has the ability to select its own agent/cache as the content delivery point.

Figure 5:
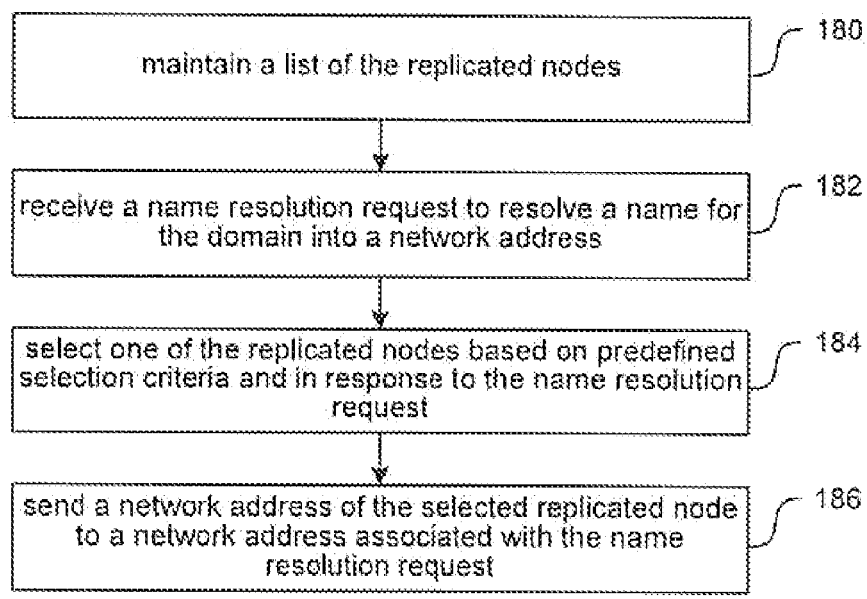
FIG. 5 shows a flow chart of operations performed when redirecting network communications within a network, in accordance with one embodiment of the present invention.

In a more general sense, the techniques of the present invention may be used for redirecting network communications within a network. This aspect is illustrated with reference to FIG. 5 of the drawings, which shows a flowchart of operations performed when redirecting network communications within a network, in accordance with one embodiment of the invention. As used herein, the term "network communication" is intended to mean any communication between two nodes in a network. Thus, for example, a network communication may include an e-mail message or an HTTP GET request. Referring to FIG. 5, at block 180, a list of replicated nodes within a computer network is maintained. In one embodiment the list is maintained in a replicated node is selected to be an authoritative server for a particular domain within the computer network. At block 182, the authoritative server receives a name resolution request from a requesting network address to resolve the name for the domain into a network address.

At block 184, the authoritative server selects one of the replicated nodes whose network address is then returned to the requesting network address in response to the name resolution request. In order to select the replicated node the authoritative server uses predefined selection criteria, policy, rules etc. At block 186, the authoritative server returns or sends the network address of the selected replicated node to the requesting network address.

According to different embodiments, different mechanisms may be used to return the network address of the selected replicated node to the requesting network address. In one embodiment, if the requesting network address is that of a DNS name resolver, then the network address of the selected replicated node is sent to the DNS name resolver which in turn sends the network address to the requesting network address. In another embodiment, if the requesting network address is that of a client device, in other words the client device has sent an application level request to the authoritative server, then the authoritative server rewrites the application level request by inserting the network address of the replicated node therein. The client device then resends the rewritten request to the replicated node.

Figure 6:
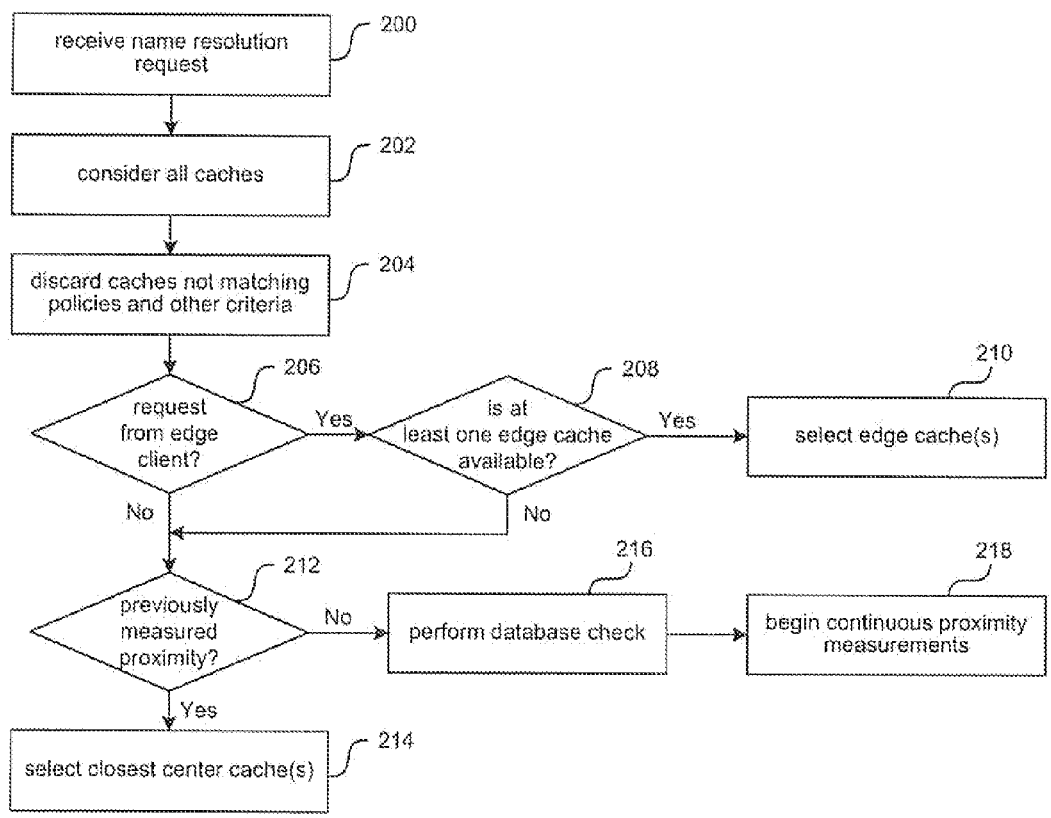
FIG. 6 shows a flow chart of operations performed, in accordance with one embodiment of the present invention, when selecting a network in a network node, wherein the nodes are classified as being center caches or edge caches.

In one embodiment, each agent/cache within a network is classified as being a center cache or an edge cache. Edge caches are caches that are assigned to fixed blocks of network addresses, whereas center caches are caches that are not assigned to fixed blocks of network addresses. The distinction between edge and center caches is useful within an ISP environment, where a point of presence (POP) consists of a fixed block of addresses that should always be served by a locally installed agent/cache. FIG. 6 of the drawings shows a flowchart of operations performed, in accordance with one embodiment of the invention, when selecting a node in a computer network, wherein the nodes are classified as being center caches or edge caches. Referring to FIG. 6, at block 200, an authoritative server for a computer domain receives a name resolution request from a requesting device. Initially, and in response to the name resolution request, at block 202 all caches within the computer network are considered. Thereafter, at block 204, the authoritative server discards those caches that do not match existing rules, policy, and selection criteria, etc.

At block 206, the authoritative server determines if the request was received from an edge client device i.e. a client device having a network address falling within the range of network addresses assigned to an edge cache. If the request is from an edge client then, at block 208, the authoritative server establishes if there is at least one edge cache available to serve the request. If there is at least one edge cache available then, at block 210, the authoritative server selects an available edge cache and returns the network address of the selected edge cache to the requesting device. If the request is not from an edge client then after execution of block 206, control is passed to block 212.

If there is no edge cache available, then after execution of block 208 control is passed to block 212, wherein the authoritative server determines if previous proximity measurements were made between each cache within the network and the network address of the requesting device. If previous proximity measurements were made, then at block 214, the authoritative server selects the closest center cache to the requesting device and returns the network address of this center cache to the requesting device. If no previous proximity measurements have been made, then at block 216, the authoritative server performs a database check in order to determine an approximate regional location for the requesting device. One example of a database that can be used to provide an approximate regional location for the requesting device is the IANA database that can be accessed with the URL: "http://www.iana.org". Once the authoritative server has determined the approximate regional location of the requesting device, the authoritative server randomly selects a center cache from within the regional location.

The authoritative server returns the network address of the randomly selected center cache to the requesting device, but in the meantime, at block 218, the authoritative server instructs all caches within the network to begin proximity measurements to the requesting device. These proximity measurements are reported to the authoritative server. When returning the network address of the randomly selected cache to the requesting device, the authoritative server sets a short TTL, forcing the requesting device to resend a name resolution request after expiration of the TTL. Thus, when the name resolution request is resent to the authoritative server, the authoritative server should have proximity information available to facilitate selection of a center cache.

Figure 7:
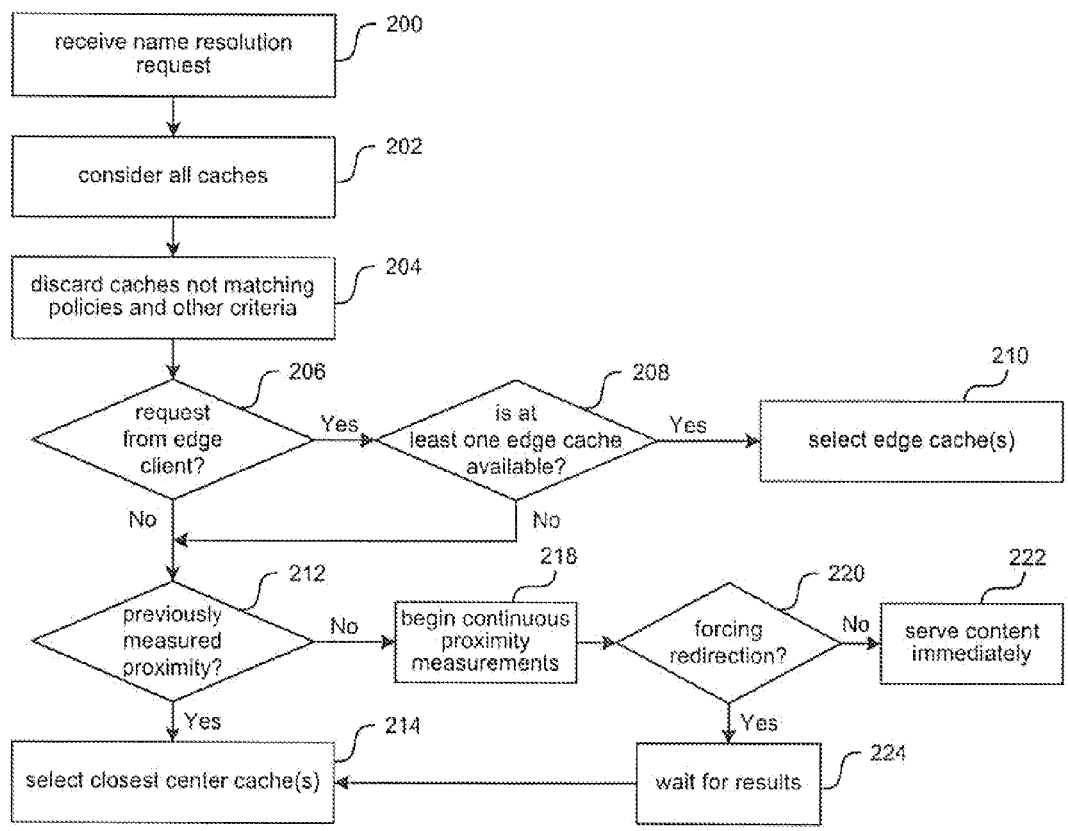
FIG. 7 shows a flow chart of operations performed, in accordance with one embodiment of the present invention, when selecting a node in a computer network in response to an application level name resolution request, wherein the nodes in the computer network are classified as being center caches or edge caches.

The example shown in FIG. 6 of the drawings pertains to a name resolution request by a DNS name resolver. FIG. 7 of the drawings shows a flowchart of operations performed, in accordance with one embodiment, when selecting a node in a computer network in response to an application level name resolution request, wherein the nodes in the computer network are classified as being center caches or edge caches. In FIG. 7, blocks in common with FIG. 8 are indicated by the same reference numerals used in FIG. 6. The main difference between the operations shown in FIG. 7 and those shown in FIG. 6 is that in FIG. 7 after execution of block 218, the authoritative server determines whether to force redirection at block 220. Whether or not redirection is to be forced is determined by a rule programmed in a rules database within the authoritative server, which indicates whether redirection is to be forced. If redirection is not to be forced then block 222 executes wherein the content is immediately served to the requesting device. If redirection is to be forced, then at block 222, the authoritative server waits for the results of the proximity measurements before executing block 214.

Figure 8A:
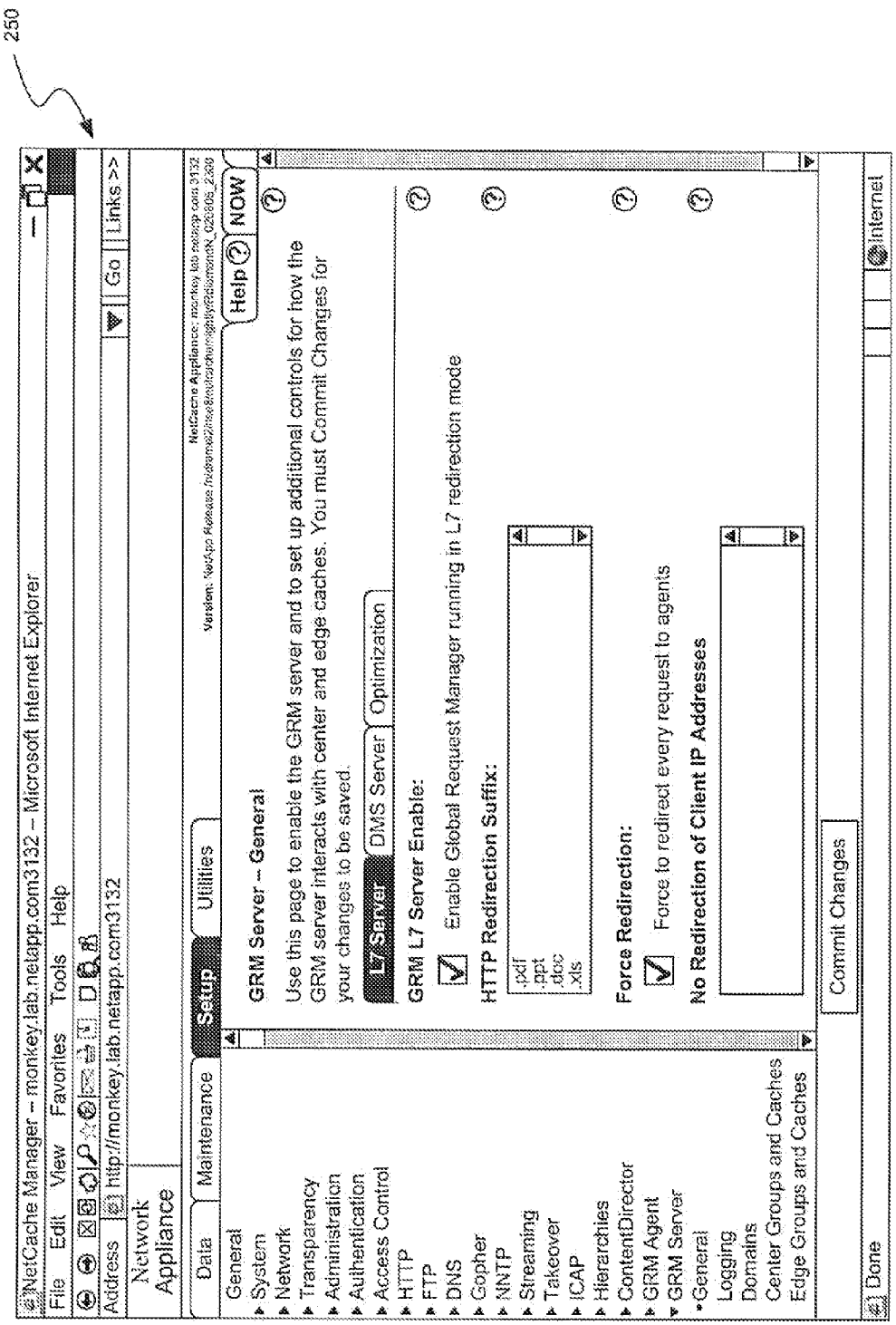
FIG. 8A to 8P of the drawings show different screen shots of a graphical user interface in accordance with one embodiment of the invention.

As noted above, the network device 10 may be configured to function as either an agent/cache device or as a server/cache device. A particular advantage of the present invention is the relative ease with which the network device 10 may be configured to function as either an agent/cache device or as a server/cache device. In order to facilitate configuration of the network device 10 as either an agent/cache device or as a server/cache device, the network device 10 includes a graphical user interface (GUI) that allows configuration of the network device 10 to perform the various functions described above. FIGS. 8A to 8P of the drawings show screenshots of various pages of a GUI of the network device 10, in accordance with one embodiment.

Referring to FIG. 8A, reference numeral 250 generally indicates a screen shot of a page of the GUI that may be used to enable the server component (GRM server) of the network device 10. The page 250 may be used to set up additional controls for how the GRM server interacts with center and edge caches. As will be seen the GRM server may be enabled to function in an application layer redirection mode (L7 redirection mode). It will be noted that when operating in L7 redirection mode, the GRM server may be configured to force redirection to the agentcachesby waiting for the results of proximity measurements or to serve the content immediately, as described above. In one embodiment, it is possible to enter a redirection suffix so that all requests for content comprising the redirection suffix will be automatically redirected. Examples of a redirection suffix include ".pdf", ".ppt", ".doc", and ".xls". Further, it is possible to override redirection in certain instances by providing a network address of a client device whose requests are not to be redirected.

Figure 8B:
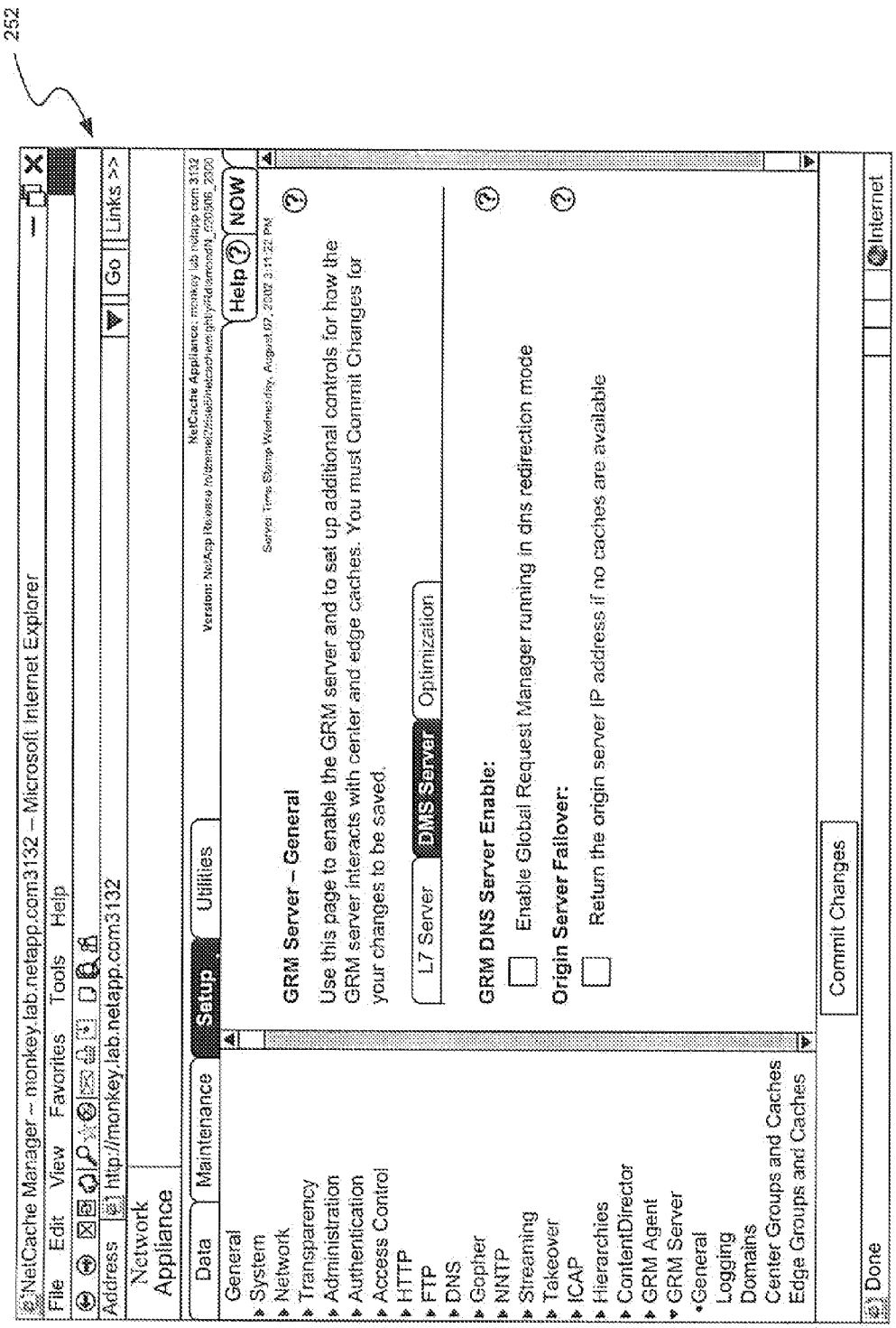

FIG. 8B shows a screenshot of a page 252 of the GUI. The page 252 may be used to enable the GRM server and to set up additional controls for how the GRM server interacts with center and edge caches. As can be seen, the page 252 has a checkbox for enabling the GRM server to run in a DNS redirection mode. Further, the page 252 has a checkbox, which when checked causes the GRM server to return a network address of an origin server if no agent/caches are available.

Figure 8C:
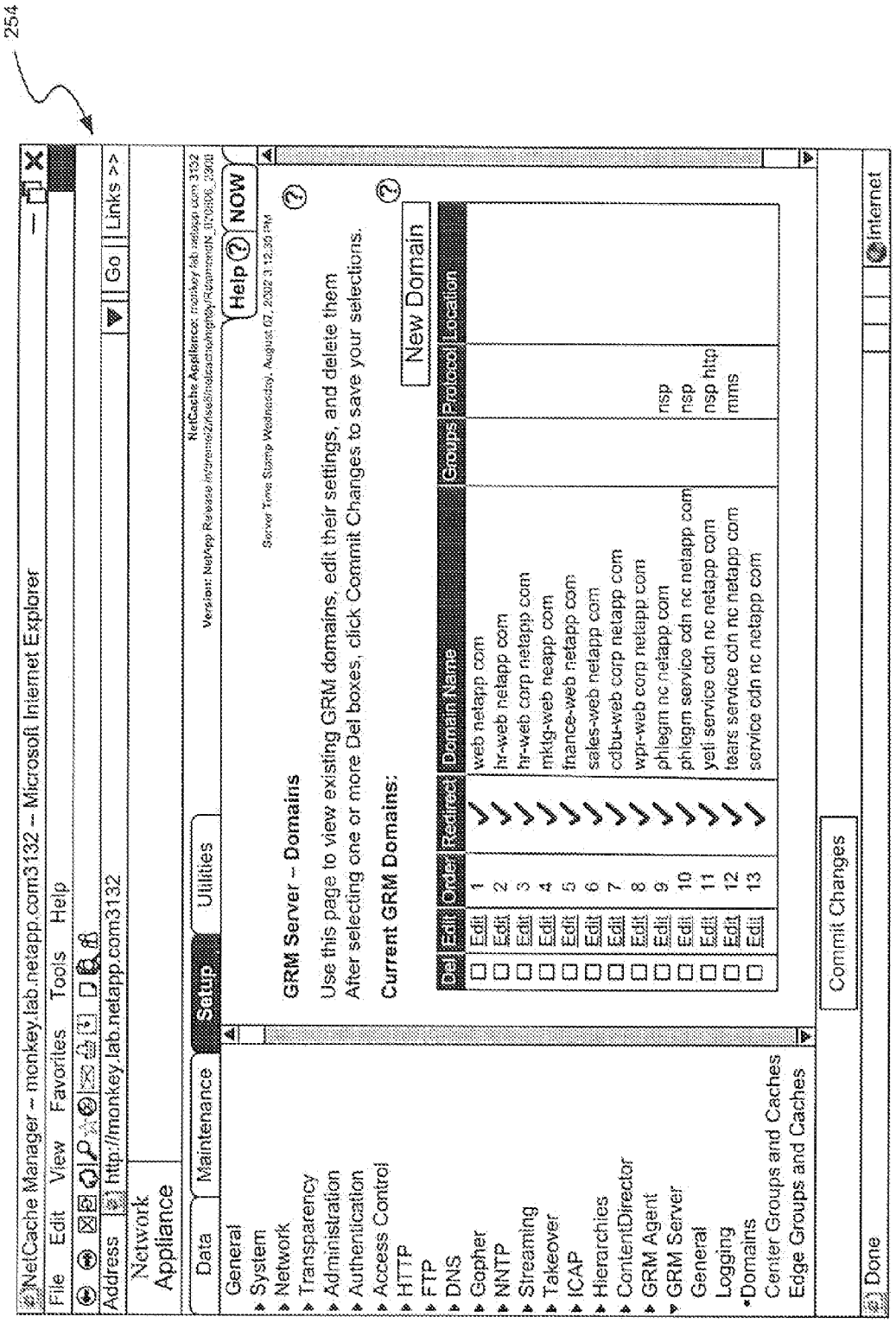
Figure 8D:
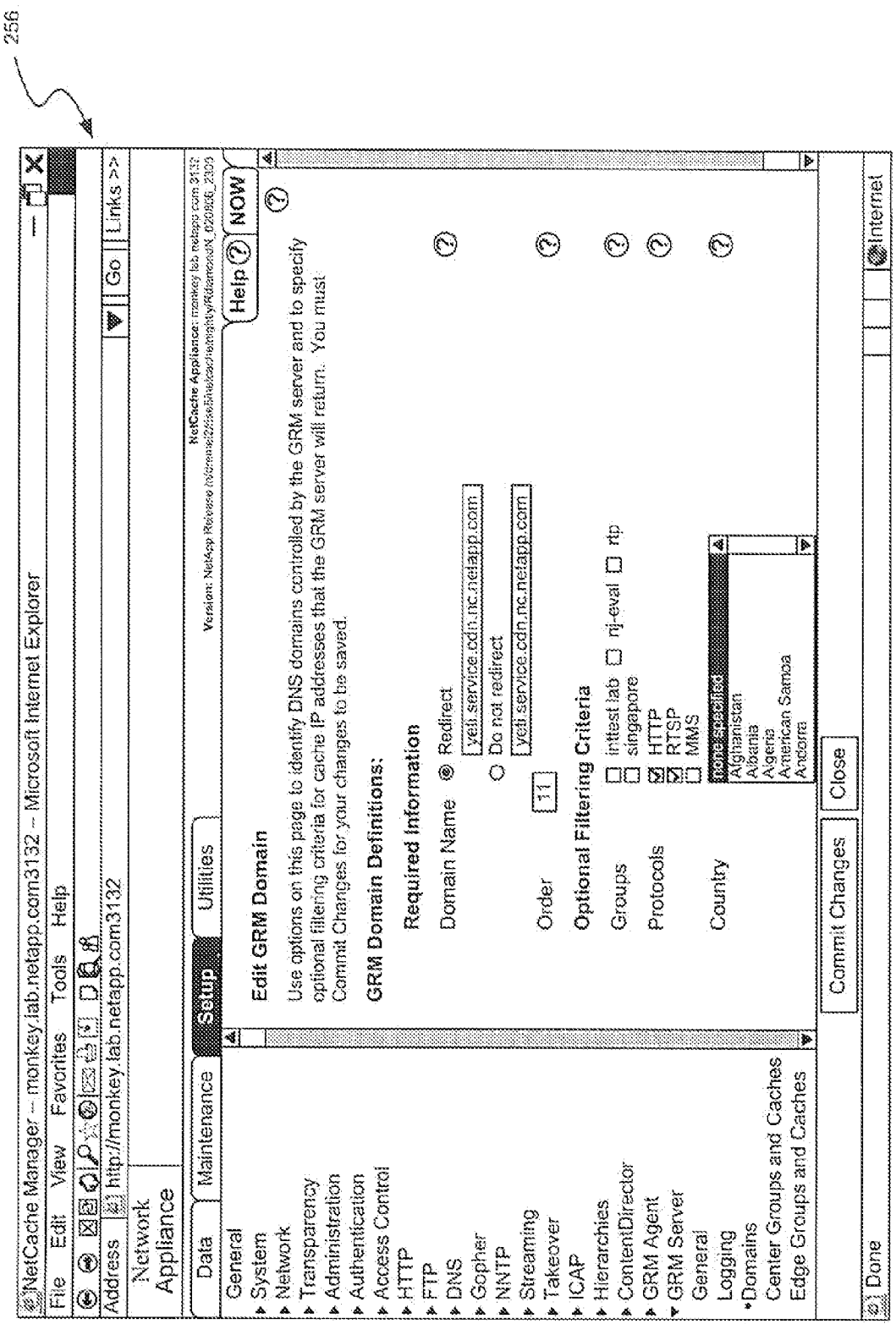

FIG. 8C shows a screenshot of a page 254 of the GUI. The page 254 may be used to view existing GRM domains, edit their settings, and delete existing domains. FIG. 8D shows a screenshot of a page 256 of the GUI. The page 256 may be used to identify DNS domains controlled by the GRM server and to specify optional filtering or selection criteria for cache network addresses that the GRM server will return. As can be seen, the optional filtering criteria includes filtering by group, protocol, country, or region.

Figure 8E:
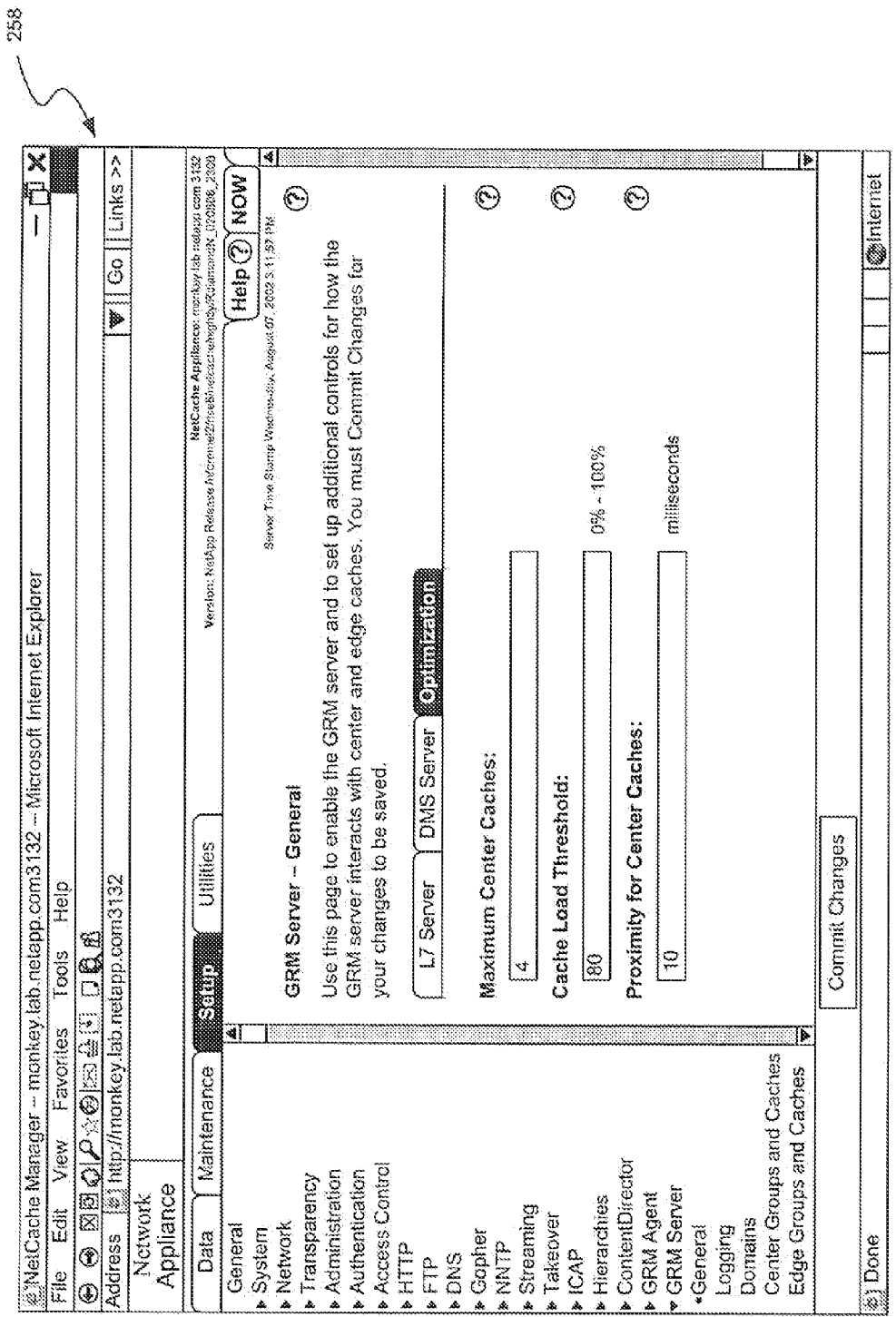

FIG. 8E shows a screenshot of a page 258 of the GUI. The page 258 may be used to enable the GRM server and to set up additional controls for how the GRM server interacts with center and edge caches. The page 258 allows values to be input for the maximum number of center caches, the cache load of threshold (defined as a value between 0 percent to 100 percent), and the proximity for the center caches expressed in milliseconds. The proximity for the center caches is used for DNS based redirection in the case wherein multiple agent/caches are reported to the GRM server. In this case all agent caches within a specified proximity range, for example, within 10 milliseconds of each other, are considered to be part of an equivalence class.

FIG. 8F of the drawings shows a screenshot of a page 260 of the GUI. The page 216 may be used to view existing GRM center groups and center caches, to edit their settings, and to enable or delete the existing GRM center groups and center caches. One or more center groups must be defined before defining a center cache. In the example shown in page 260, it will be seen that a center group titled "inttest lab" has been assigned a location of "United States, West, North America".

Figure 8H:
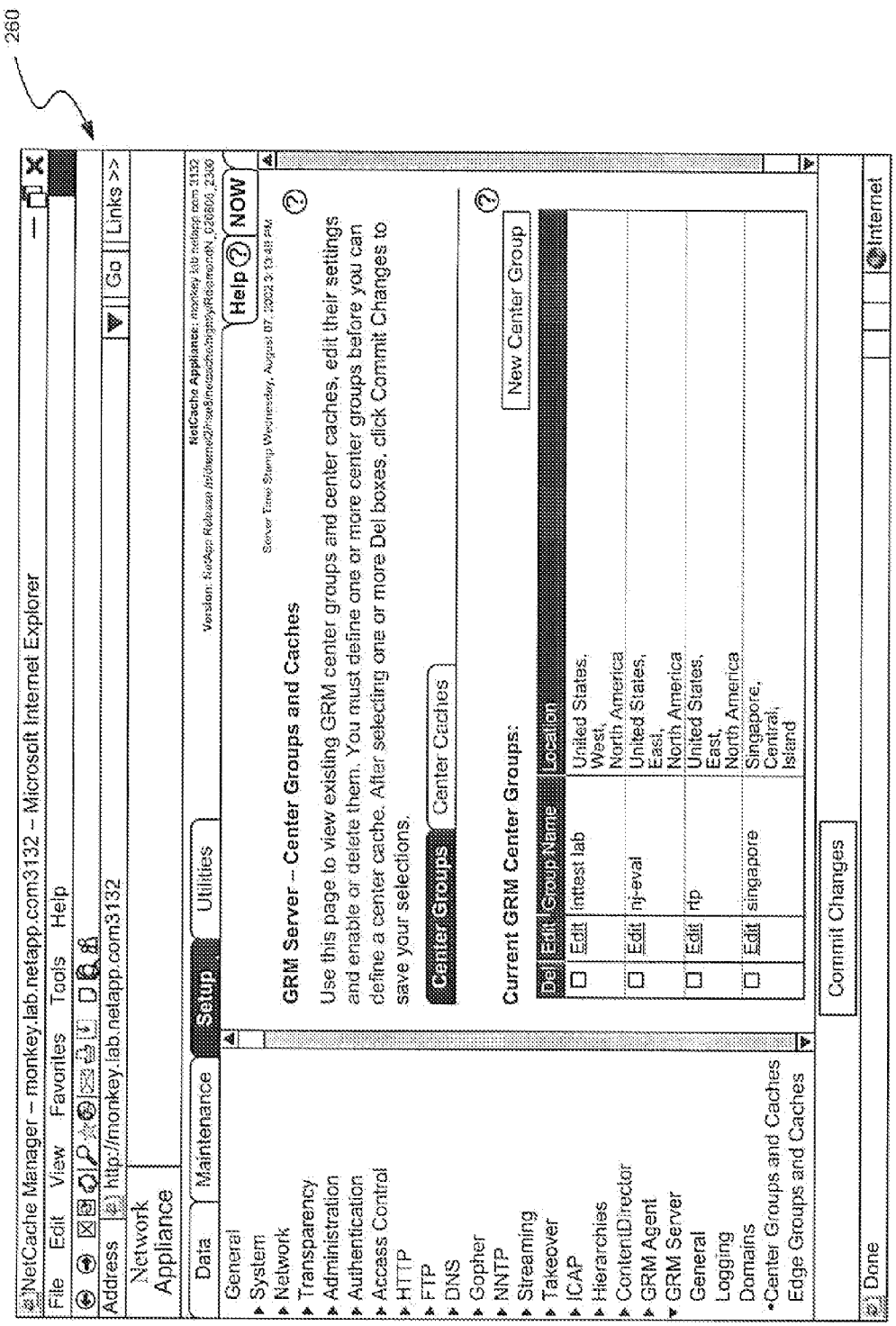
Figure 8G:
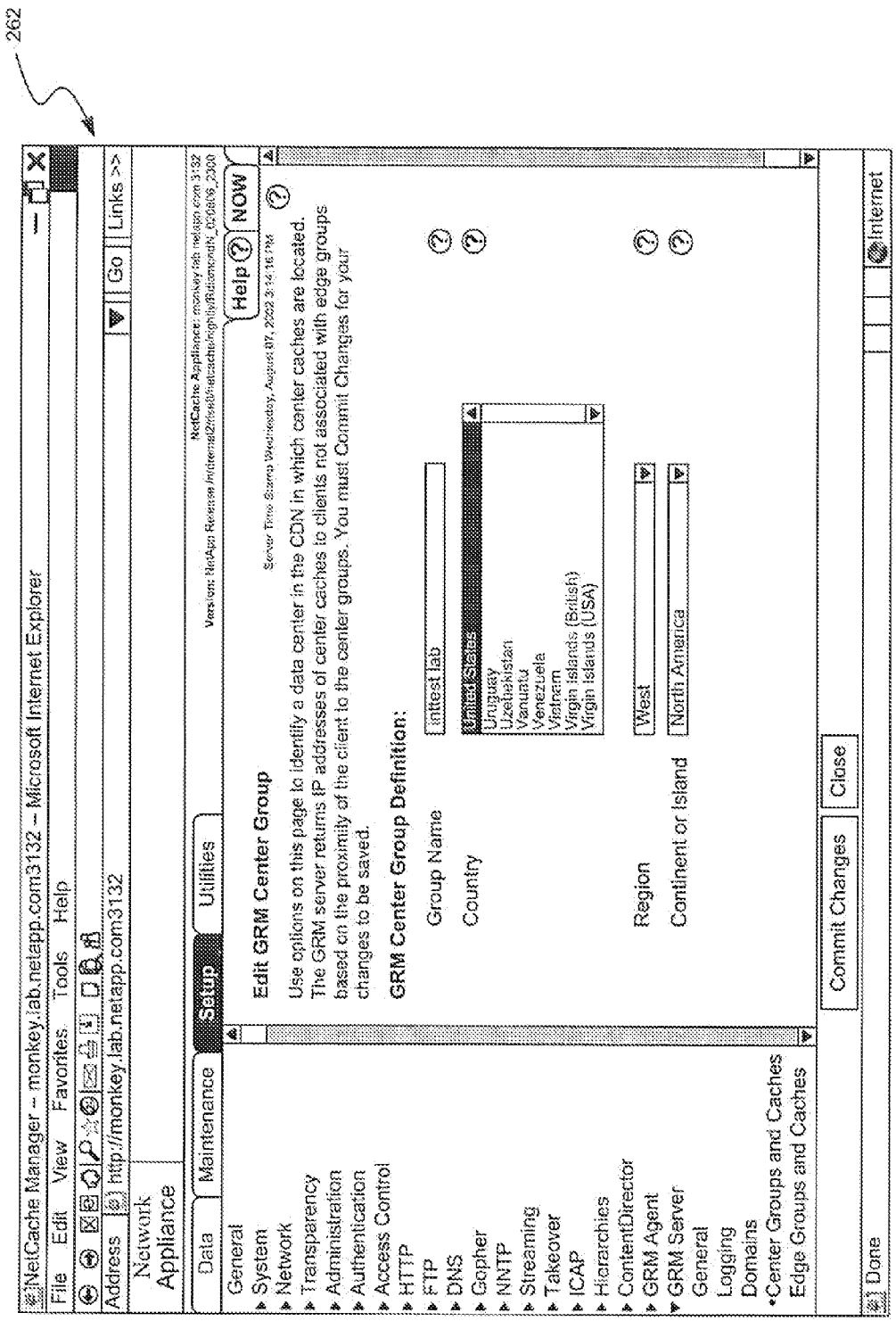

FIG. 8G shows a screenshot of a page 262 of the GUI. The page 262 provides options to identify a data center within a CDN in which center caches are located. The GRM server returns network (IP) addresses of center caches to clients not associated with edge groups based on the proximity of the client to the center groups.

FIG. 8G shows a screenshot of a page 262 of the GUI. The page 262 provides options to identify a data center within a CDN in which center caches are located. The GRM server returns network (IP) addresses of center caches to clients not associated with edge groups based on the proximity of the client to the center groups.

FIG. 8H of the drawings shows a screenshot of a page 264 of the GUI. The page 264 may be used to view existing GRM edge groups, to edit their settings, and to enable or delete the existing GRM edge groups.

Figure 8I:
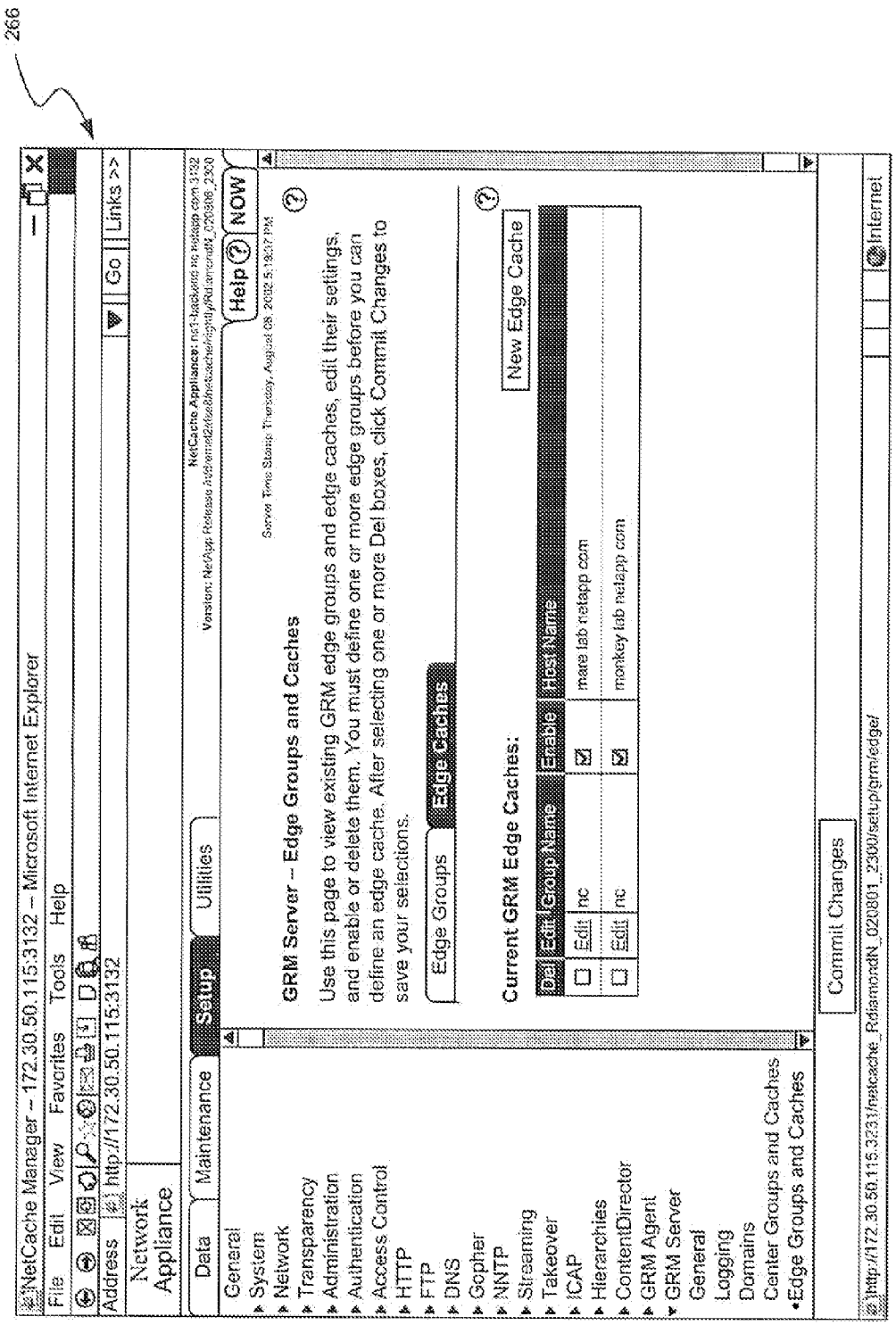
Figure 8J:
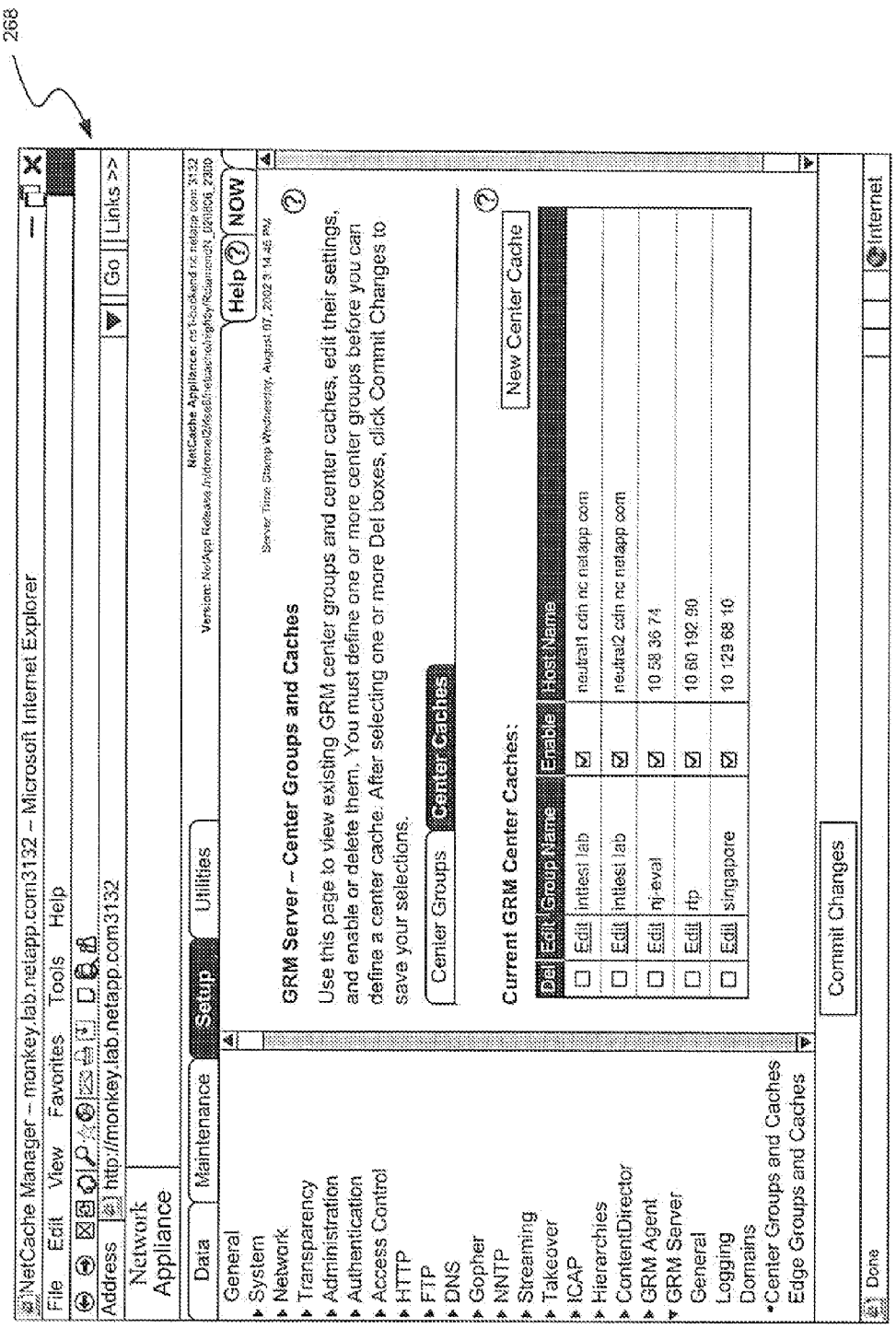
Figure 8K:
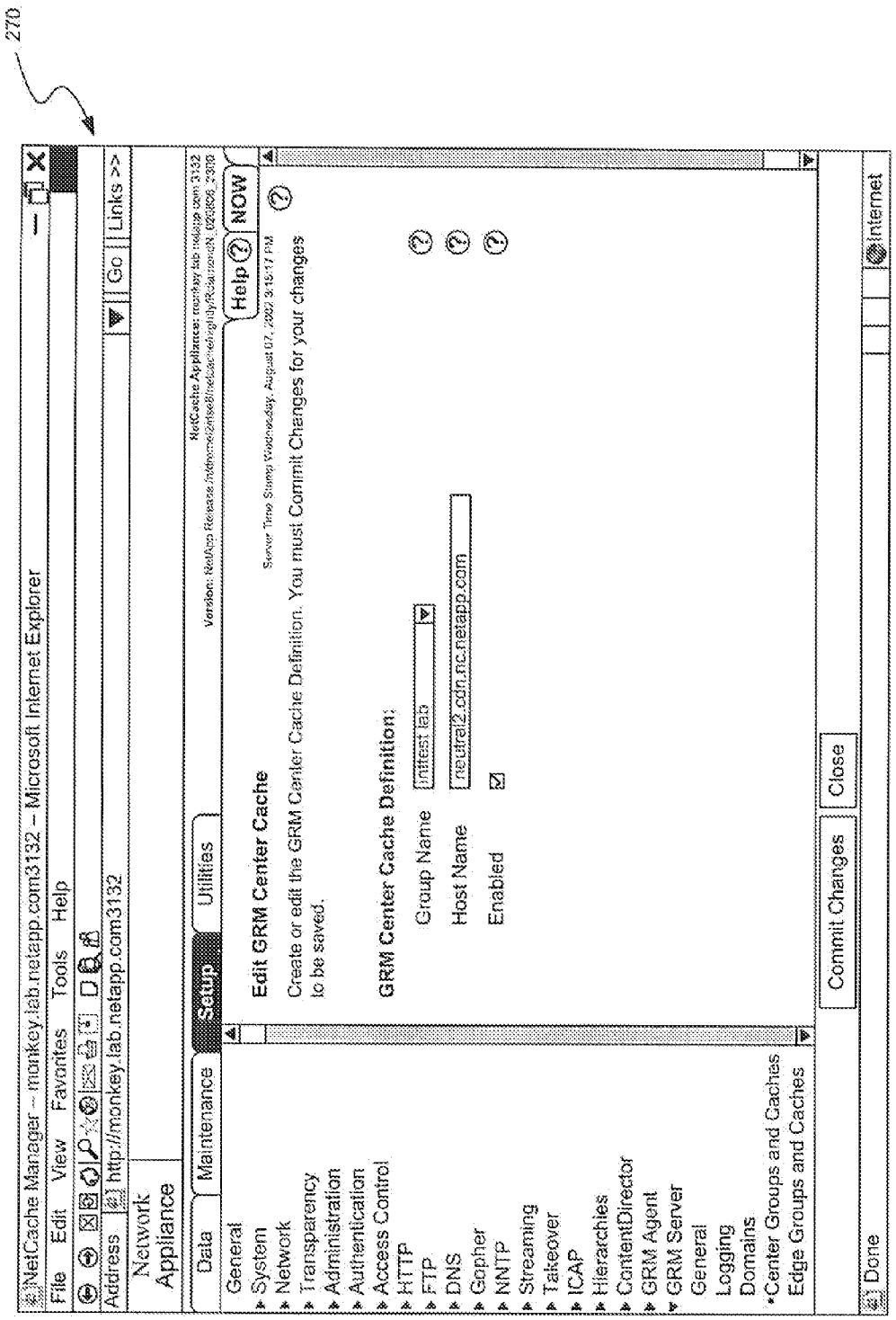
Figure 8L:
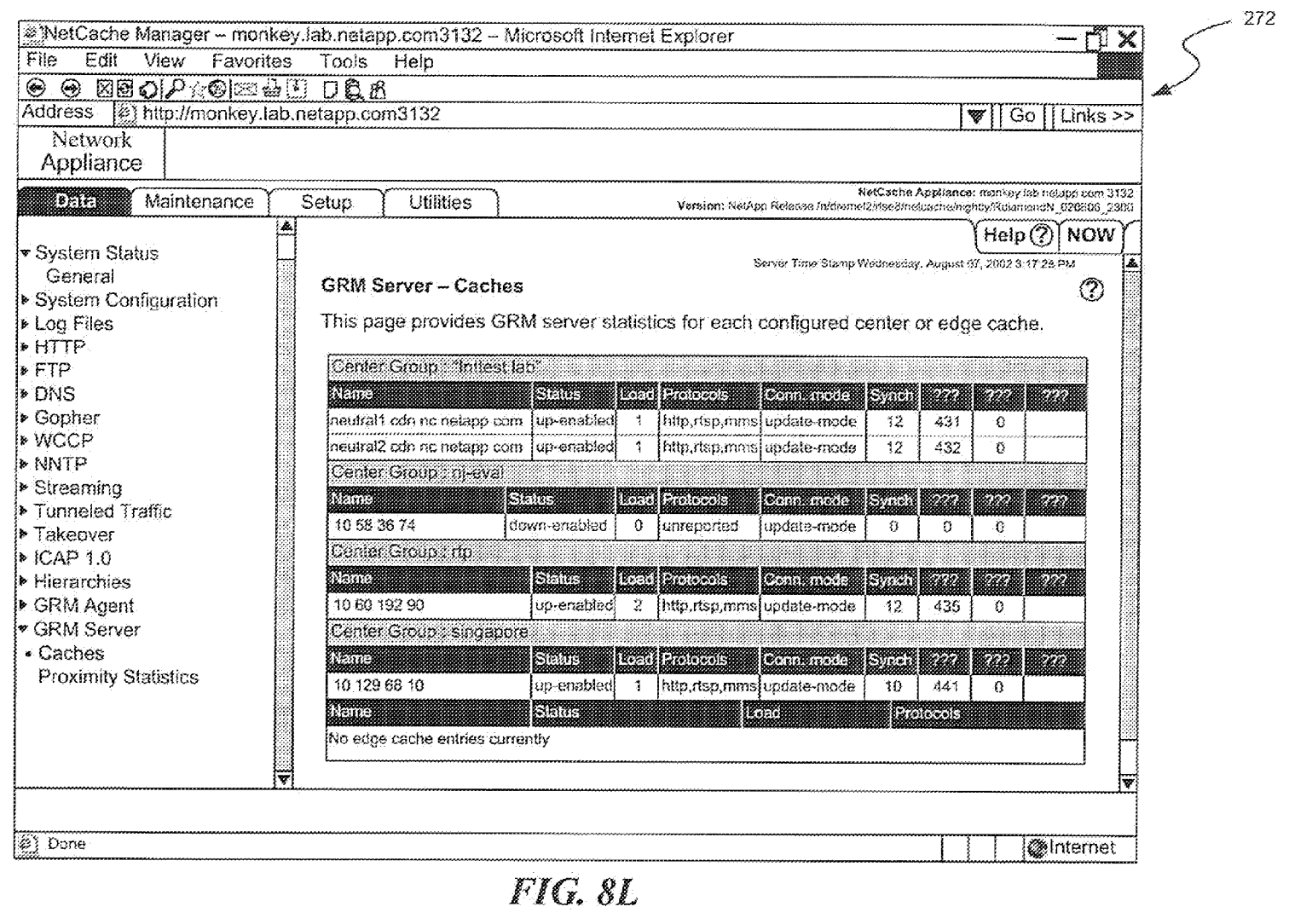
Figure 8M:
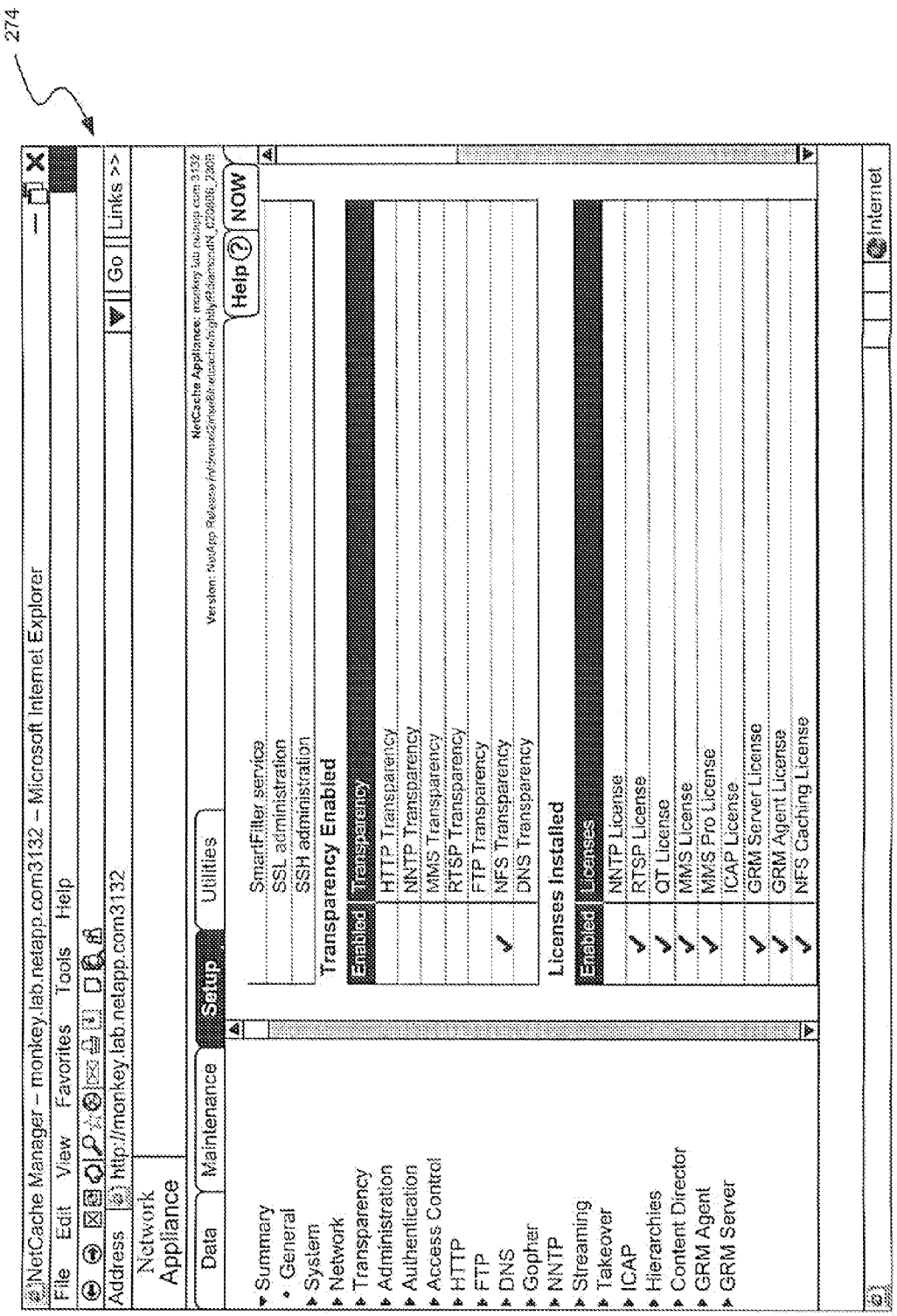
Figure 8N:
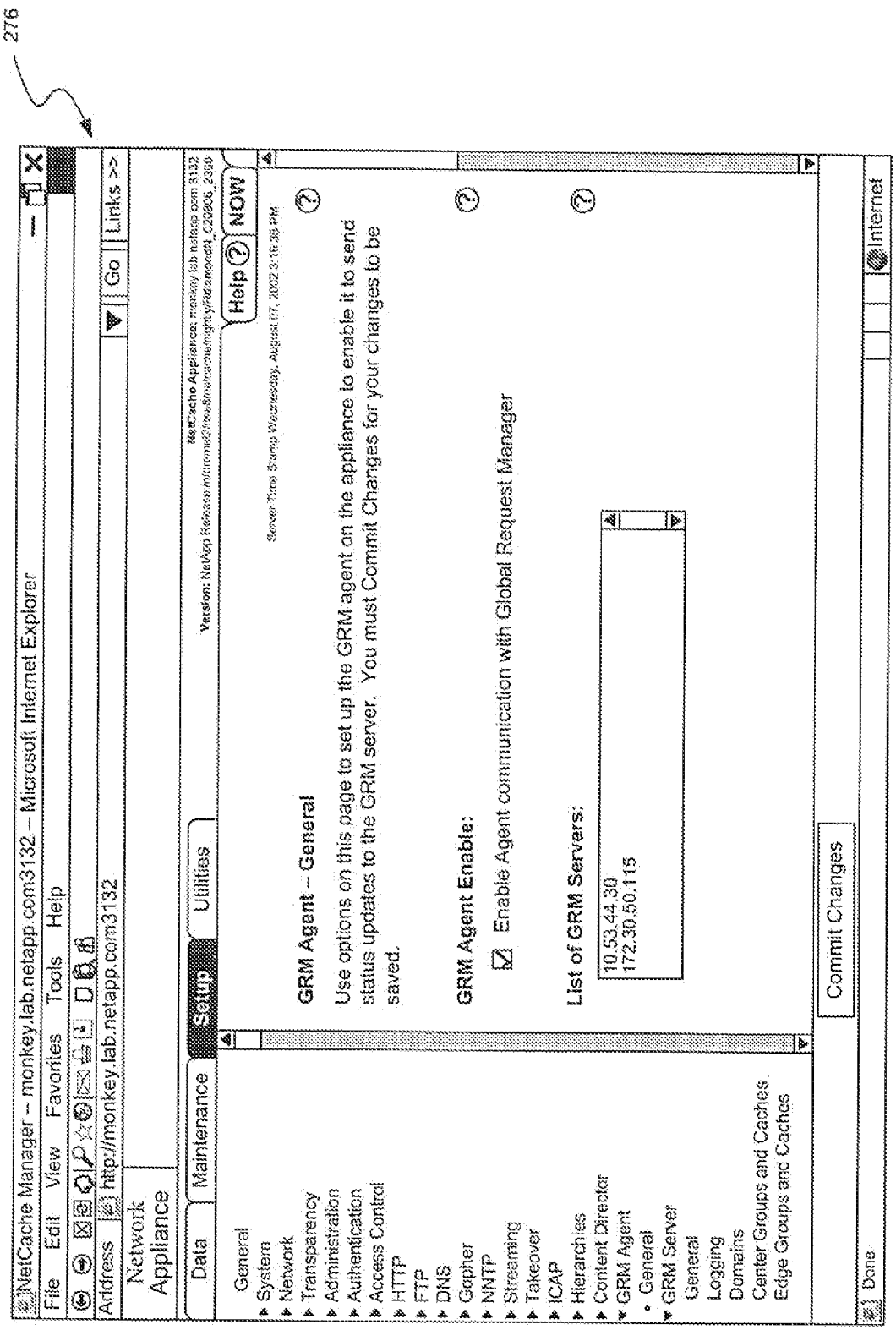
Figure 80:
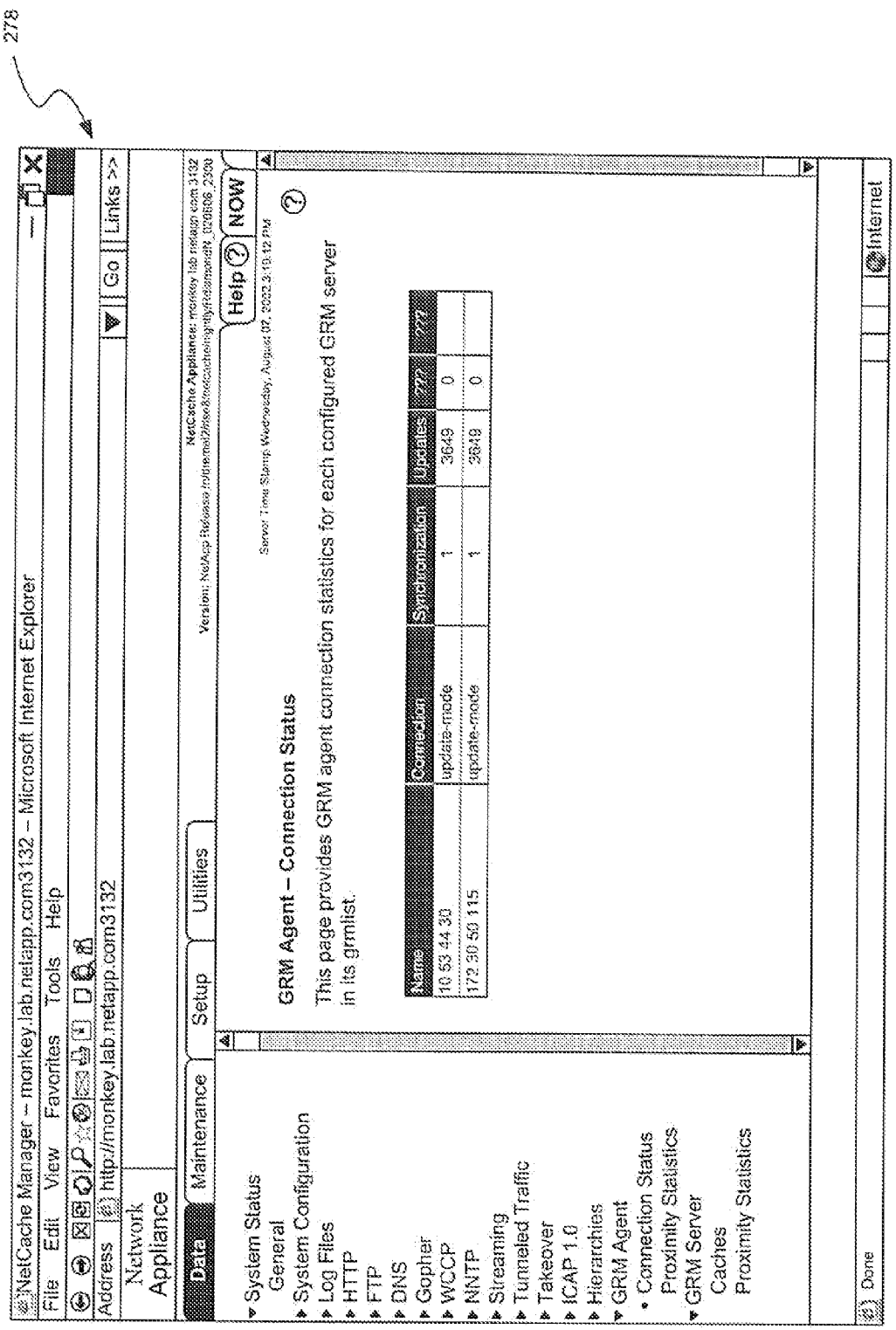
Figure 8P:
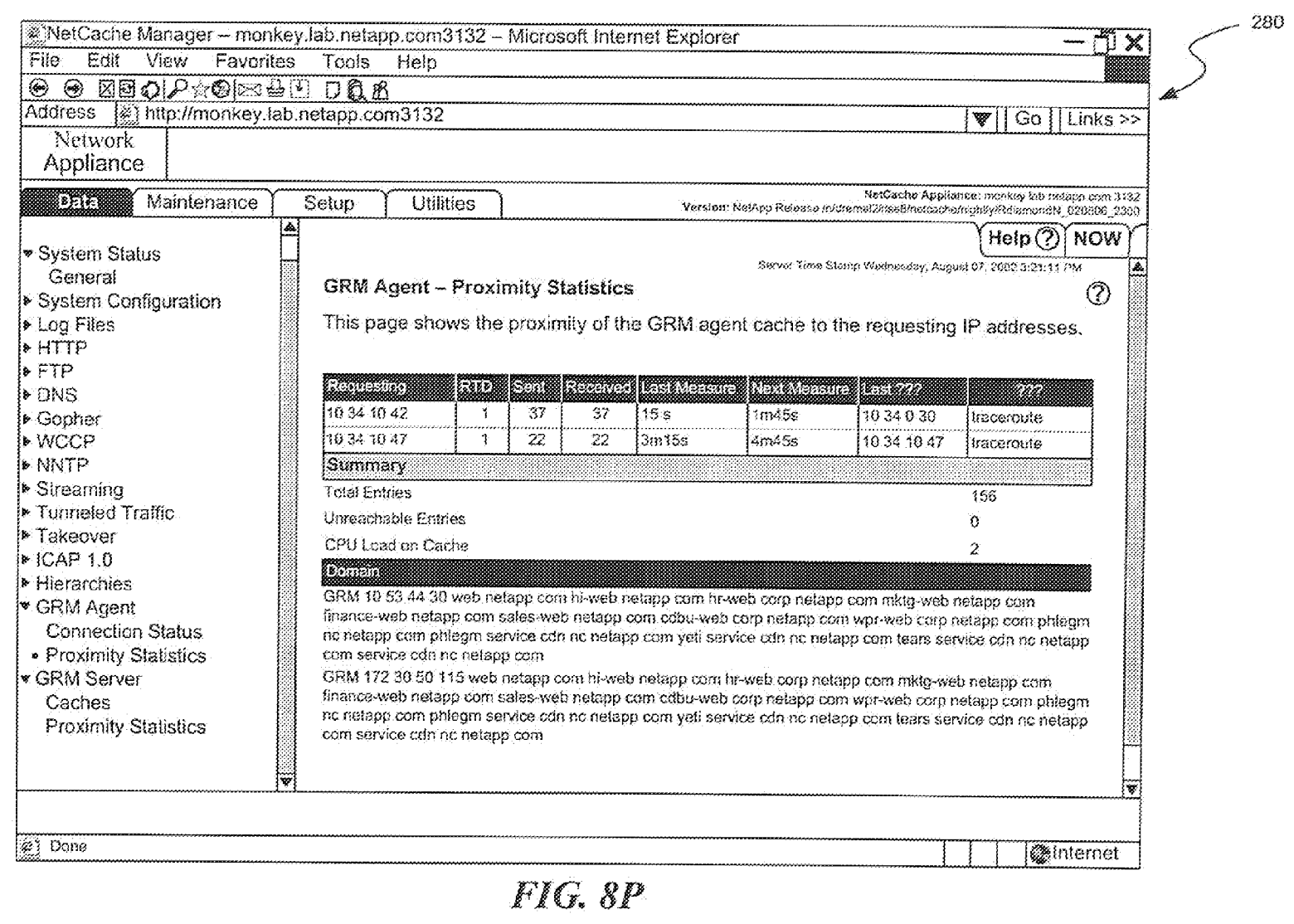

FIG. 8I shows a screenshot of a page 266 of the GUI. The page 266 may be used to view existing GRM edge caches, edit their settings, and enable or delete the existing GRM edge caches.

FIG. 8 J shows a screenshot of a page 268 of the GUI. The page 268 may be used to view existing GRM center groups and center caches, edit their settings, and enable or delete them.

FIG. 8 K shows a screenshot of a page 270 of the GUI. The screenshot 270 may be used to create or edit the GRM center cache definition. As can be seen a GRM center cache definition includes a group name, a host name, and an indication of whether or not the GRM center cache has been enabled.

FIG. 8 L shows a screenshot of a page 272 of the GUI. The screenshot 272 provides GRM server statistics for each configured center of edge cache. The GRM server statistics include an operational status for each configured center of edge cache, a current load of the configured center of edge cache, the networking protocols supported by the configured center of edge cache, etc.

FIG. 8 M shows a screenshot of a page 274 of the GUI. The screenshot 274 shows what licenses have been enabled within the particular network device 10.

FIG. 8 N shows a screenshot of a page 276 of the GUI. The screenshot 276 provides options to set up a GRM agent on the network device 10 so that it sends status updates to a GRM server. As can be seen from the screenshot 276, the GUI provides a checkbox which when checked enables the GRM agent/cache to communicate with a GRM server whose network address is listed in a list of GRM servers.

FIG. 8 O shows a screenshot of a page 278 of the GUI. The screenshot 278 provides GRM agent connection statistics for each configured GRM server. FIG. 8 P shows a screenshot of a page 280 of the GUI. The screenshot also provides proximity information of a GRM agent cache to a requesting IP address.

Figure 9:
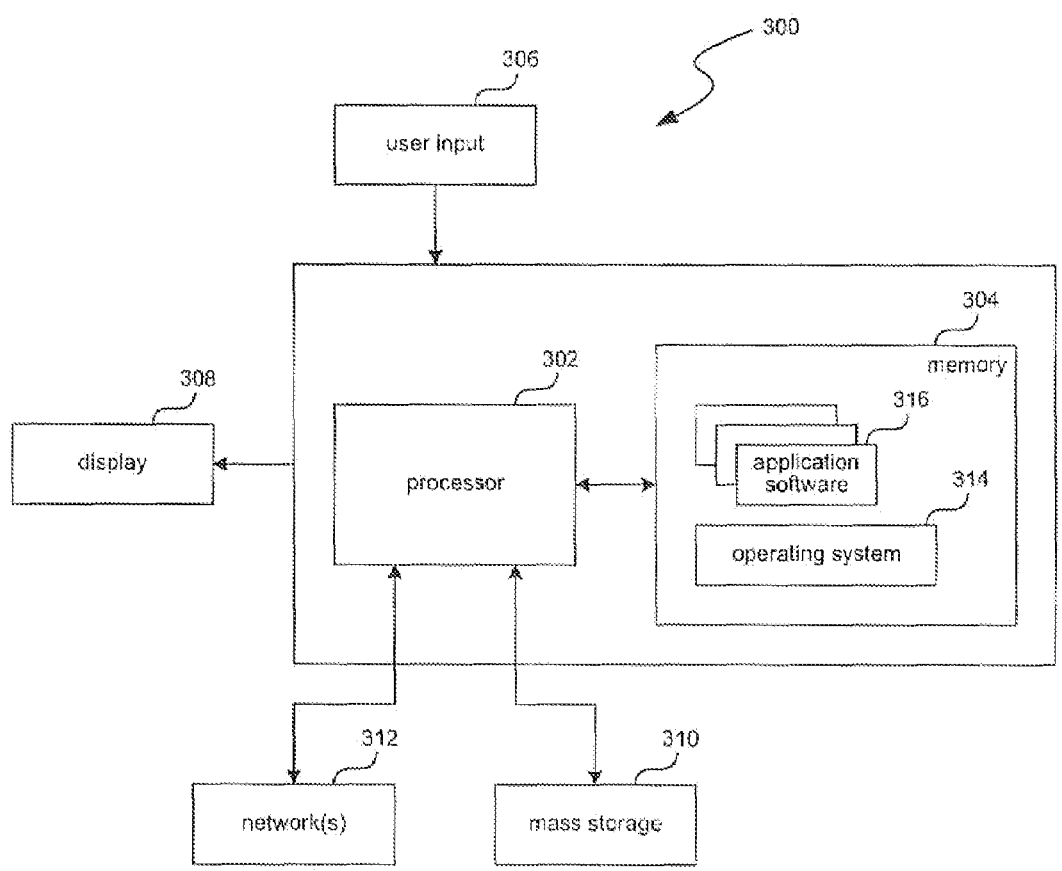
FIG. 9 shows a high level block diagram of hardware that may be used to implement a network device in accordance with the present invention.

Various hardware platforms may be used to implement the network device 10. One such hardware platform is shown in FIG. 9, the drawings referring to FIG. 9, the hardware platform 300 includes at least one processor 302 coupled to a memory 304. The processor 302 may represent one or more processors (e.g. microprocessors), and the memory 304 may represent random access memory (RAM) devices comprising a main storage of the platform 300, as well as any supplemental levels of memory e.g., cache memories, non-volatile or back-up memories (e.g. programmable or flash memories), read-only memories, etc. In addition, the memory 304 may be considered to include memory storage physically located elsewhere in platform 300, e.g. any cache memory in the processor 302, as well as any storage capacity used as a virtual memory, e.g., as stored on a mass storage device 310 or on another computer coupled to the platform 300 via a network 312.

The hardware platform 300 also typically receives a number of inputs and outputs for communicating information externally. For interface with a user or operator, the platform 300 typically includes one or more user input devices 306 (e.g., a keyboard, a mouse, etc.) and a display 308 (e.g., a CRT monitor, a LCD panel).

The hardware platform 300 may also include one or more mass storage devices 310, e.g., a floppy or other removable disk drive, a hard disk drive, a Direct Access Storage Device (DASD), an optical drive (e.g. a CD drive, a DVD drive, etc.) and/or a tape drive, among others. Furthermore, the platform 300 may include an interface with one or more networks 312 (e.g., a land, a WAN, a wireless network, and/or the Internet among others) to permit the communication of information with other computers coupled to the networks 312. It should be appreciated that platform 300 typically includes suitable analog and/or digital interfaces between processor 302 and each of the components 304, 306, 308 and 312 as is well known in the art.

The hardware platform 300 operates under the control of an operating system 314, and executes various computer software applications, components, programs, objects, modules, etc. (e.g. a program or module which performs operations as shown in FIGS. 5, 6, and 7 of the drawings). Moreover, various applications, components, programs, objects, etc. may also execute on one or more processors in another computer coupled to platform 300 via a network 312, e.g. in a distributed computing environment, whereby the processing required to implement the functions of a computer program may be allocated to multiple computers over a network.

In general, the routines executed to implement the embodiments of the invention, may be implemented as part of an operating system or a specific application, component, program, object, module or sequence of instructions referred to as "computer programs". The computer programs typically comprise one or more instructions set at various times in various memory and storage devices in a computer, and that, when read and executed by one or more processors in a computer, cause the computer to perform these steps necessary to execute steps or elements involving the various aspects of the invention. Moreover, while the invention has been described in the context of fully functioning computers and computer systems, those skilled in the art will appreciate that the various embodiments of the invention are capable of being distributed as a program product in a variety of form, and that the invention applies equally regardless of the particular type of signal bearing media used to actually off the distribution. Examples of signal bearing media include but are not limited to recordable type media such as volatile and non-volatile memory devices, floppy and other removable disks, hard disk drives, optical disks (e.g. CD ROMS, DVDs, etc.), among others, and transmission type media such as digital and analog communication links.

Although the present invention has been described with reference to specific exemplary embodiments, it will be evident that the various modification and changes can be made to these embodiments without departing from the broader spirit of the invention as set forth in the claims. For example, aspects of the present invention may be implemented in firmware or hardware in addition to software. Accordingly, the specification and drawings are to be regarded in an illustrative sense rather than in a restrictive sense.

What is claimed is:

1. A method for selecting a replicated node from a domain of replicated nodes in a computer network, the method comprising:

maintaining data identifying the replicated nodes;

receiving status information from an operational node of the replicated nodes, the status information indicating the operational node is working as a replicated node;

receiving a name resolution request to resolve a name for the domain into a network address, wherein the name resolution request is associated with a client device;

when proximity information about the client device is unavailable, deferring the name resolution request until the proximity information is determined, wherein the deferring includes sending a response designating a future time for a second request to be sent;

in response to the name resolution request, selecting one of the replicated nodes based on the proximity information and predefined selection criteria, wherein the selecting excludes the operational node of the replicated nodes, wherein the predefined selection criteria comprise exclusionary rules to exclude some of the replicated nodes from the selecting, and wherein the exclusionary rules comprise rules to exclude a replicated node from the selecting based on what networking protocols are supported by the replicated node; and sending a network address of the selected replicated node to a network address associated with the name resolution request.

2. The method of claim 1, wherein the exclusionary rules further comprise rules to exclude a replicated node from the selecting based on a geographic location of the replicated node.

3. The method of claim 1, further comprising grouping the replicated nodes into groups, and wherein the predefined selection criteria include a rule to select only replicated nodes from a particular group based on the name resolution request.

4. The method of claim 1, wherein the name resolution request is in the form of a request for content, and wherein sending the network address of the selected replicated node comprises rewriting the request for content to cause the request to be redirected to the selected replicated node.

5. The method of claim 1, wherein the selecting one of the replicated nodes based on the proximity information comprises:

comparing proximity measurements based on the name resolution request and the replicated nodes, wherein the one of the replicated nodes is selected according to a result of the comparing.

6. The method of claim 1, wherein deferring the name resolution request comprises sending a network address of a randomly selected replicated node to the network address associated with the name resolution request.

7. The method of claim 1, wherein the future time is designated by a time-to-live (TTL) value.

8. A computer readable storage facility having stored thereon a sequence of instructions, which when executed by a computer, causes the computer to perform a method for selecting a replicated node from a domain of replicated nodes in a computer network, the method comprising:

maintaining a list of the replicated nodes;

receiving status information from an operational node of the replicated nodes, the status information indicating the operational node is working as a replicated node;

receiving a name resolution request to resolve a name for the domain into a network address, wherein the name resolution request is associated with a client device;

when proximity information about the client device is unavailable, deferring the name resolution request until the proximity information is determined, wherein the deferring includes sending a response designating a future time for a second request to be sent;

in response to the name resolution request, selecting one of the replicated nodes based on the proximity information and predefined selection criteria, wherein the selecting excludes the operational node of the replicated nodes, wherein the predefined selection criteria comprise exclusionary rules to exclude some of the replicated nodes from the selecting, and wherein the exclusionary rules comprise rules to exclude a replicated node from the selecting based on what networking protocols are supported by the replicated node; and sending a network address of the selected replicated node to a network address associated with the name resolution request.

9. The computer readable medium of claim 8, wherein the selecting one of the replicated nodes based on the proximity information comprises:

comparing proximity measurements based on the name resolution request and the replicated nodes, wherein the one of the replicated nodes is selected according to a result of the comparing.

10. A system for selecting a replicated node from a domain of replicated nodes in a computer network, the system comprising:

a processor;

a memory coupled to the processor, the memory storing instructions which when executed by the processor cause the system to perform a method comprising:

maintaining data identifying the replicated nodes;

receiving status information from an operational node of the replicated nodes, the status information indicating the operational nodes is working as a replicated node;

receiving a name resolution request to resolve a name for the domain into a network address, wherein the name resolution request is associated with a client device;

when proximity information about the client device is unavailable, deferring the name resolution request until the proximity information is determined, wherein the deferring includes sending a response designating a future time for a second request to be sent;

in response to the name resolution request, selecting one of the replicated nodes based on the proximity information and predefined selection criteria, wherein the selecting excludes the operational node of the replicated nodes, wherein the predefined selection criteria comprise exclusionary rules to exclude some of the replicated nodes from the selecting and wherein the exclusionary rules comprise rules to exclude a replicated node from the selecting based on what networking protocols are supported by the replicated node; and sending a network address of the selected replicated node to a network address associated with the name resolution request.

11. The system of claim 10, wherein the selecting one of the replicated nodes based on the proximity information comprises:

comparing proximity measurements based on the name resolution request and the replicated nodes, wherein the one of the replicated nodes is selected according to a result of the comparing.

12. A method for selecting a replicated node from a domain of replicated nodes in a computer network, the method comprising:

maintaining data identifying the replicated nodes;

receiving status information from an operational node of the replicated nodes, the status information indicating the operational node is working as a replicated node;

receiving a name resolution request to resolve a name for the domain into a network address, wherein the name resolution request is initiated by a client device;

when proximity information about the client device is unavailable, instructing at least one of the replicated nodes to determine proximity information about the client device;

in response to the name resolution request, selecting one of the replicated nodes based on the proximity information and predefined selection criteria, wherein the selecting excludes the operational node of the replicated nodes, wherein the predefined selection criteria comprise exclusionary rules to exclude some of the replicated nodes from the selecting, and wherein the exclusionary rules comprise rules to exclude a replicated node from the selecting based on what networking protocols are supported by the replicated node; and sending a network address of the selected replicated node to a network address associated with the name resolution request.

13. The method of claim 12, wherein the determining proximity information comprises:

pinging the client device; and measuring a response time of the client device.

14. The method of claim 12, wherein the determining proximity information comprises:

performing a reverse domain name service (DNS) lookup of the client device.

15. The method of claim 12, wherein the determining proximity information comprises:

performing a trace route to the client device.

* * * * *